US 9,488,729 B2
*Nov. 8, 2016

(12) United States Patent
Averin et al.

(10) Patent No.: US 9,488,729 B2
(45) Date of Patent: *Nov. 8, 2016

(54) DETECTION OF SCINTILLATIONS IN SIGNALS OF GLOBAL NAVIGATION SATELLITE SYSTEMS CAUSED BY IONOSPHERIC IRREGULARITIES

(71) Applicant: Topcon Positioning Systems, Inc., Livermore, CA (US)

(72) Inventors: Sergey Vladislavovich Averin, Obninsk (RU); Roman Anatolyevich Nevzorov, Moscow (RU); Andrey Valeryevich Plenkin, Kashira (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/428,476

(22) PCT Filed: Aug. 7, 2013

(86) PCT No.: PCT/RU2013/000681
§ 371 (c)(1),
(2) Date: Mar. 16, 2015

(87) PCT Pub. No.: WO2015/020551
PCT Pub. Date: Feb. 12, 2015

(65) Prior Publication Data
US 2015/0253431 A1    Sep. 10, 2015

(51) Int. Cl.
*G01S 19/43*    (2010.01)
*G01S 19/20*    (2010.01)
(Continued)

(52) U.S. Cl.
CPC ............... *G01S 19/07* (2013.01); *G01S 19/04* (2013.01); *G01S 19/43* (2013.01)

(58) Field of Classification Search
CPC ......... G01S 19/20; G01S 19/26; G01S 19/44
USPC ........... 342/357.21, 357.26, 357.46, 357.68, 342/357.58; 701/468, 470
See application file for complete search history.

(56) References Cited

U.S. PATENT DOCUMENTS

| 8,094,068 B2 | 1/2012 | Trautenberg |
| 2003/0135327 A1 | 7/2003 | Levine et al. |
| 2012/0169542 A1 | 7/2012 | Mathews et al. |

FOREIGN PATENT DOCUMENTS

| EP | 2279426 B1 | 5/2012 |
| JP | H11-304903 A | 11/1999 |
| RU | 2467352 C2 | 11/2012 |

OTHER PUBLICATIONS

International Search Report and Written Opinion mailed on May 22, 2014, in connection with international patent application No. PCT/RU2013/000682, 7 pgs.

(Continued)

*Primary Examiner* — Dao Phan
(74) *Attorney, Agent, or Firm* — Chiesa Shahinian & Giantomasi PC

(57) ABSTRACT

A scintillation caused by ionospheric irregularities during Global Navigation Satellite System (GNSS) measurements is detected. A first input GNSS measurement corresponding to a navigation satellite and corresponding to a first carrier frequency and a second GNSS measurement corresponding to the navigation satellite and corresponding to a second carrier frequency, in which the second carrier frequency is different from the first carrier frequency, are received. A geometry-free combination (GFC) parameter based at least in part on the first input GNSS measurement, the second input GNSS measurement, the first carrier frequency, and the second carrier frequency is calculated. The occurrence of a scintillation caused by an ionospheric irregularity is determined based at least in part on the GFC parameter. In an embodiment of the invention, the dispersion of the GFC parameter over a specified time interval is determined. A scintillation is detected if the dispersion exceeds a specified threshold value.

27 Claims, 11 Drawing Sheets

(51) Int. Cl.
*G01S 19/07* (2010.01)
*G01S 19/04* (2010.01)

(56) References Cited

OTHER PUBLICATIONS

International Search Report and Written Opinion mailed on May 22, 2014, in connection with international patent application No. PCT/RU2013/000681, 7 pgs.

M. Mainul Hogue and Norbert Jakowski (2012), "Ionospheric Propagation Effects on GNSS Signals and New Correction Approaches," Global Navigation Satellite Systems: Signal, Theory and Applications, Prof. Shuanggen Jin (Ed.), ISBN: 978-953-307-843-4, InTech, pp. 381-405.

Hernandez-Pajares, M. et al, "The Ionosphere: Effects, GPS Modeling and the Benefits for Space Geodetic Techniques," Journal of Geodesy. DOI 10.1007/s00190-011-0508-5. Published on line Sep. 2011. pp. 1-21.

Jakowski, N. et al., "Ionospheric Impact on GNSS Signals," German Aerospace Center Institute of Communications and Navigation. May 2008. pp. 1-15.

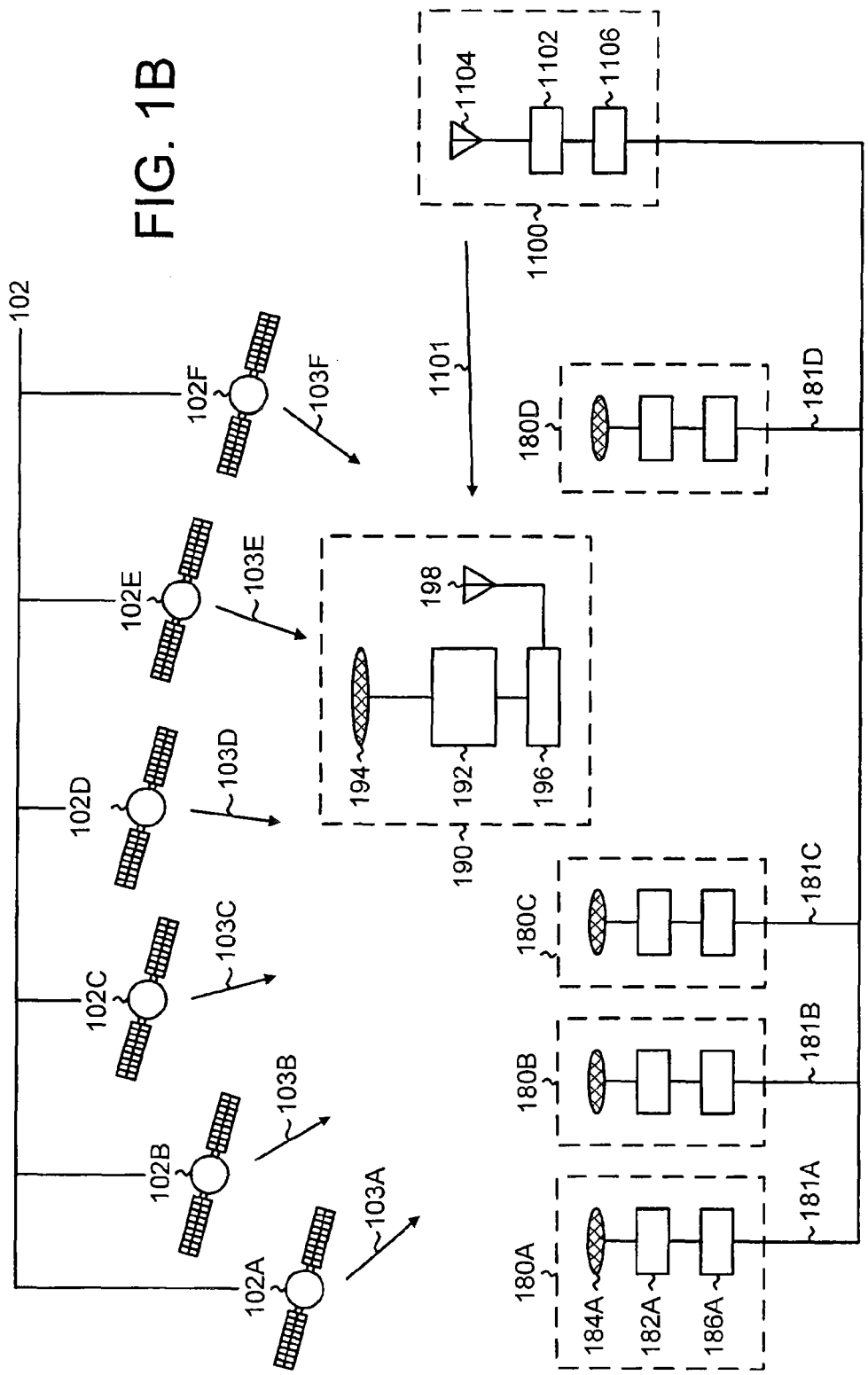

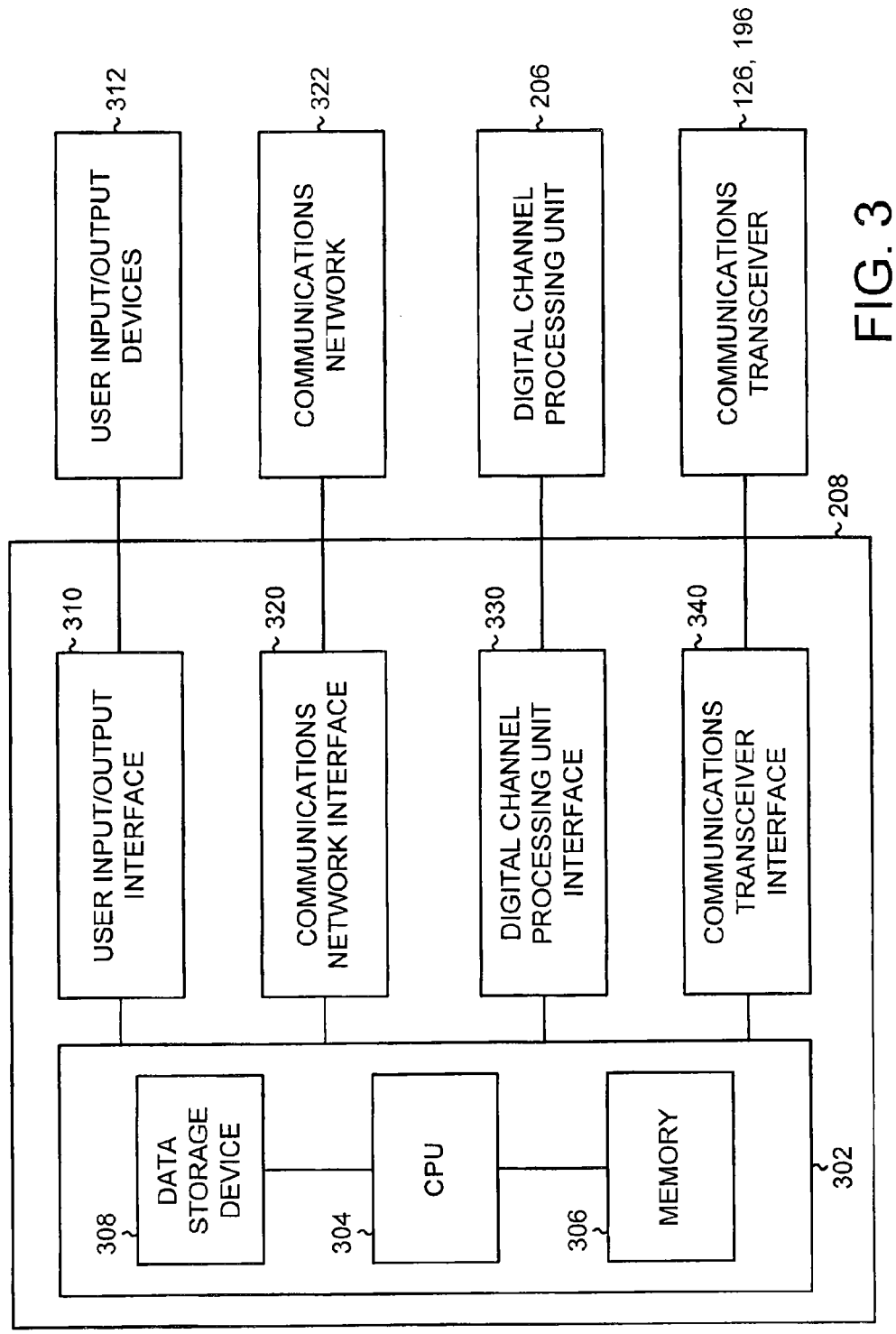

DETECTION OF SCINTILLATIONS IN SIGNALS OF GLOBAL NAVIGATION SATELLITE SYSTEMS CAUSED BY IONOSPHERIC IRREGULARITIES

CROSS-REFERENCE TO RELATED APPLICATIONS

This application is related to U.S. patent application Ser. No. 14/428,431, filed Mar. 16, 2015, which is a national stage (under 35 U.S.C. 371) of International Patent Application No. PCT/RU2013/000682, filed Aug. 7, 2013, each of which is herein incorporated by reference in its entirety.

BACKGROUND OF THE INVENTION

The present invention relates generally to global navigation satellite systems, and more particularly to method and apparatus for detection of scintillations in signals of global navigation satellite systems caused by ionospheric irregularities.

Global navigation satellite systems (GNSSs) can determine target parameters, such as position, velocity, and time (PVT). Examples of currently deployed global navigation satellite systems include the United States Global Positioning System (GPS) and the Russian GLONASS. Other global navigation satellite systems, such as the Chinese Beidou and the European GALILEO systems, are under development. In a GNSS, a navigation receiver receives and processes radio signals transmitted by satellites located within a line-of-sight of the receiver. The satellite signals comprise carrier signals modulated by pseudo-random binary codes. The receiver measures the time delays of the received signals relative to a local reference clock or oscillator. Code phase measurements enable the receiver to determine the pseudo-ranges between the receiver and the satellites. The pseudo-ranges differ from the actual ranges (distances) between the receiver and the satellites due to an offset between the time scales of the GNSS and the receiver. If signals are received from a sufficiently large number of satellites, then the measured pseudo-ranges can be processed to determine the coordinates and the offset between the time scales of the GNSS and the receiver. This operational mode is referred to as a stand-alone mode, since the measurements are determined by a single receiver. A stand-alone system typically provides meter-level accuracy of positioning.

To improve the accuracy of positioning, differential navigation (DN) systems have been developed. In a DN system, the position of a user is determined relative to a base station, also referred to as a base. The base is typically fixed, and the coordinates of the base are precisely known; for example, by surveying. The base contains a navigation receiver that receives satellite signals and that can determine the corrections to GNSS measurements based on the known base position. In some DN systems, the raw measurements of the base can serve as corrections.

The user, whose position is to be determined, can be stationary or mobile; in a DN system, the user is often referred to as a rover. The rover also contains a navigation receiver that receives GNSS satellite signals. Corrections generated at the base are transmitted to the rover via a communications link. To accommodate a mobile rover, the communications link is often a wireless link. The rover processes the corrections received from the base, along with measurements taken with its own receiver, to improve the accuracy of determining its position. Accuracy is improved in the differential navigation mode because errors incurred by the receiver at the rover and by the receiver at the base are highly correlated. Since the coordinates of the base are accurately known, measurements from the base can be used for calculating corrections, thus compensating the errors at the rover. A DN system provides corrections to pseudo-ranges measured with code phase.

The position determination accuracy of a differential navigation system can be further improved if the pseudo-ranges measured with code phase are supplemented with the pseudo-ranges measured with carrier phase. If the carrier phases of the signals transmitted by the same satellite are measured by both the navigation receiver in the base and the navigation receiver in the rover, processing the two sets of carrier phase measurements can yield a position determination accuracy to within several percent of the carrier's wavelength. A differential navigation system that computes positions based on real-time carrier phase pseudo-range measurements, in addition to the code phase pseudo-range measurements, is often referred to as a real-time kinematic (RTK) system. Processing carrier phase measurements to determine coordinates includes the step of ambiguity resolution; that is, determining the integer number of cycles in the carrier signal received by the navigation receiver from an individual satellite.

The accuracy with which target parameters can be determined using GNSS signals is affected by various factors; in particular, by the propagation of the satellite signals through the ionosphere. The ionosphere is a dispersive media located approximately between 40 and 1000 km above the Earth's surface. It is saturated by electrically charged particles (electrons and ions). The highest concentration of charged particles is within 250-400 km above the Earth's surface. Since the ionosphere is a dispersive media, it influences both the group delay and phase advance of radio signals, resulting in different values for the group velocity and the phase velocity of radio signals. The product of the group velocity and phase velocity in the ionosphere is equal to the speed of light squared.

The values of the group velocity and the phase velocity are dependent on the integral of the concentration of charged particles along the signal propagation path. The concentration of charged particles is characterized by the value of Total Electron Content (TEC). TEC is counted as the number of electrons in a tube of 1 $m^2$ cross section extending from the transmitter to the receiver. In the case of GNSS, the transmitter is a GNSS satellite, and the receiver is GNSS navigation receiver.

As the TEC increases, the group velocity decreases, and the phase velocity increases. The TEC value is dependent on the state of the ionosphere and the obliquity factor. The state of the ionosphere strongly depends on the sun. When the sun rises, its radiation breaks up gas molecules into ions and electrons. The electron density reaches its maximum around 2 pm local time. Then ions and electrons start to recombine, and, at night, the electron density declines to its daily minimum.

Earth seasonal variations also lead to variations in the TEC. The sun is higher above the horizon in summer than in winter; consequently, on average, the TEC is higher in summer than in winter. The TEC is also dependent on the geographical position on the Earth, as the elevation of the sun is different for different latitudes, and the Earth's magnetic field is different for different locations.

Similarly, the sun has its own seasonal variations, such that approximately every 11-12 years its activity reaches the maximum. Approximate years of maximum of solar activity are 2001, 2013, etc. The increased solar activity is characterized by frequent solar flares that eject plasma, including high-energy protons, accompanied by X-rays. Such solar flares are the reasons for high and non-uniform concentration of free electrons in the Earth's ionosphere. The most difficult ionospheric irregularities to predict are ionospheric irregularities of relatively small size, such that receivers separated by ~1 km or less on the ground could receive satellite signals with noticeably different group delay due to the ionosphere. These relatively small size irregularities not only delay but also scatter radio signals, leading to rapid fluctuations in amplitude and phase; these rapid fluctuations are referred to as scintillations. In the most severe cases, scintillations can lead to complete loss of signal.

Method and apparatus for the detection of scintillations in global navigation satellite systems caused by ionospheric irregularities are therefore advantageous.

BRIEF SUMMARY OF THE INVENTION

A scintillation caused by ionospheric irregularities during Global Navigation Satellite System (GNSS) measurements is detected. A first input GNSS measurement corresponding to a navigation satellite and corresponding to a first carrier frequency and a second GNSS measurement corresponding to the navigation satellite and corresponding to a second carrier frequency, in which the second carrier frequency is different from the first carrier frequency, are received. A geometry-free combination parameter based at least in part on the first input GNSS measurement, the second input GNSS measurement, the first carrier frequency, and the second carrier frequency is calculated. The occurrence of a scintillation caused by an ionospheric irregularity is determined based at least in part on the geometry-free combination parameter.

These and other advantages of the invention will be apparent to those of ordinary skill in the art by reference to the following detailed description and the accompanying drawings.

BRIEF DESCRIPTION OF THE DRAWINGS

FIG. 1B shows an example of a global navigation satellite system in which the navigation receiver operates in a network differential navigation mode;

FIG. 3 shows a high-level schematic functional block diagram of a control and computing system implemented with a computer;

DETAILED DESCRIPTION

Global navigation satellite systems (GNSSs) can operate in various operational modes. Different operational modes require equipment of different complexities and can determine target parameters (such as position, velocity, and time) with different accuracies. The types and quantities of data to be processed also depend on the operational mode. Several operational modes are summarized below.

Figure 1A:
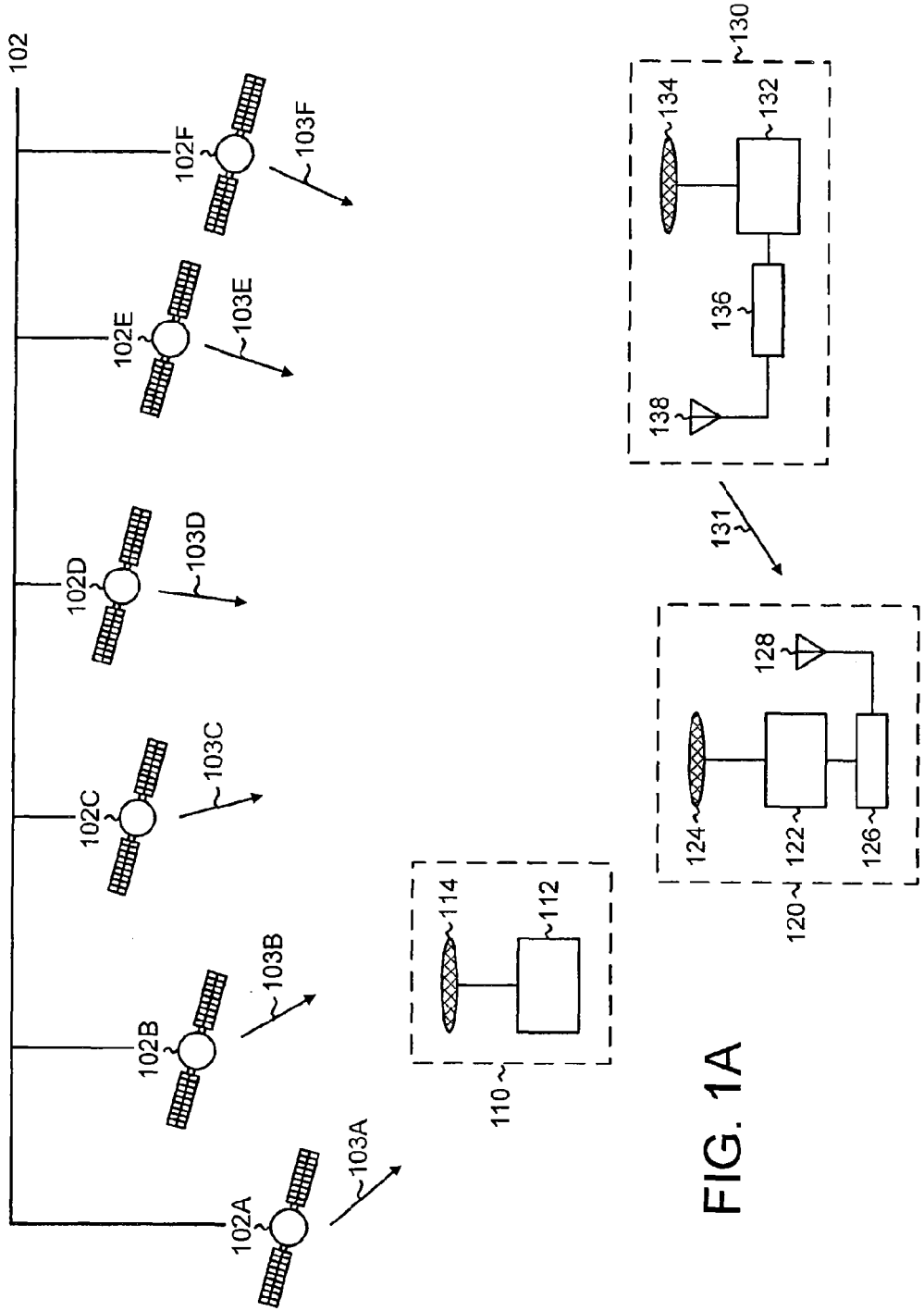
FIG. 1A shows an example of a global navigation satellite system in which the navigation receiver operates in a stand-alone mode or in a single-base-station differential navigation mode.

FIG. 1A shows a high-level schematic of a global navigation satellite system (GNSS). A constellation of global navigation satellites 102 transmits navigation signals. Shown are six representative navigation satellites, denoted navigation satellite 102A—navigation satellite 102F, which transmit navigation signal 103A—navigation signal 103F, respectively. In general, the navigation satellites can belong to more than one global navigation satellite system (for example, GPS and GLONASS).

Refer to the GNSS measurement unit 110, which operates in a stand-alone mode. The GNSS measurement unit 110 includes the antenna 114 and the navigation receiver 112. The antenna 114 receives navigation signals, such as navigation signal 103A—navigation signal 103F; from these navigation signals, the navigation receiver 112 can calculate target parameters, such as precision time referenced to a GNSS system clock and position and velocity referenced to the antenna 114. In some GNSS measurement units, the antenna is mounted in a fixed relationship with respect to the navigation receiver. If the GNSS measurement unit 110 is carried by a person who is walking or running, the GNSS measurement unit 110 can be used to calculate the position and velocity of the person as a function of time. If the GNSS measurement unit 110 is mounted on a moving vehicle, the GNSS measurement unit 110 can be used to calculate the position and velocity of the vehicle as a function of time.

In other GNSS measurement units, the antenna can be moved with respect to the navigation receiver. In one application, the antenna 114 is mounted on the blade of a bulldozer, and the navigation receiver 112 is mounted inside the cab of the bulldozer; the antenna 114 is coupled to the navigation receiver 112 via a flexible cable. The GNSS measurement unit 110 can then be used to measure the position and velocity of the blade as a function of time. To simplify the discussion below, phrases such as "position of the navigation receiver" or "position and velocity of the navigation receiver" are used; strictly, however, "position" and "velocity" refer to the parameters of the antenna that receives the navigation signals that are then processed by the navigation receiver.

The navigation signals comprise carrier signals modulated by pseudo-random binary codes. The navigation receiver measures the time delays of the received signals relative to a local reference clock or oscillator. Code phase measurements enable the navigation receiver to determine the pseudo-ranges, which in essence are estimates of the distances between the navigation receiver and the navigation satellites. The pseudo-ranges differ from the actual ranges (distances) between the navigation receiver and the navigation satellites due to presence of the term determined by the offset between the time scales of the navigation receiver and the respective GNSS.

If navigation signals are received from a sufficiently large number of navigation satellites, then the measured pseudo-ranges can be processed to determine the position of the navigation receiver. In general, the three-dimensional coordinates of the navigation receiver can be determined; a reference Cartesian coordinate (x,y,z) system can be used. The reference Cartesian coordinate system can be an Earth Centered Earth Fixed (ECEF) system; WGS-84 is an example of an ECEF system. Two-dimensional coordinates along a reference horizontal plane (x-y plane) or a onedimensional coordinate (Z or height) along an axis normal to the reference horizontal plane can also be determined. The reference horizontal plane can, for example, be tangent to the WGS-84 ellipsoid. A time referenced to a GNSS system clock can also be calculated by the navigation receiver from the navigation signals (which contain timing information). Velocity of the navigation receiver can be calculated by taking the time derivative of position as a function of time, by processing Doppler measurements, or by processing carrier phase measurements over a specific interval of time.

Various error sources contribute to errors in determination of the position and time. Examples of error sources include satellite clock errors, satellite ephemeris errors, and variations in propagation velocities of the navigation signals due to the ionosphere and troposphere. Time scales of the navigation satellites are referenced to precision atomic on-board clocks and are synchronized with the GNSS time scale; however, there are residual satellite-specific drifts and offsets with respect to that GNSS time scale. Calculations of position, velocity, and time using pseudo-ranges require ephemeris data (orbital positions of the satellites); ephemeris data is encoded on the navigation signals, and is updated in real time periodically. Measured pseudo-ranges are affected by the propagation velocity of the navigation signals between the navigation satellites and the navigation receiver. The propagation velocity depends on the medium and varies as the navigation signal travels through the ionosphere and through the troposphere; instabilities in the ionosphere and troposphere can result in dynamic changes to the propagation velocity.

Some errors can be reduced by operating the GNSS in a differential navigation (DN) mode. Refer again to FIG. 1A. The GNSS measurement unit 130, also referred to as the base station (or base) 130, is fixed or stationary; its coordinates are precisely known (for example, from high-precision surveying measurements). The GNSS measurement unit 120, also referred to as the rover 120, in general is mobile.

The base station 130 includes the antenna 134 and the navigation receiver 132. The antenna 134 receives navigation signals, such as navigation signal 103A—navigation signal 103F. The base station 130 also includes the communications transceiver 136 and the antenna 138. Similarly, the rover 120 includes the antenna 124 and the navigation receiver 122. The antenna 124 receives navigation signals, such as navigation signal 103A—navigation signal 103F. The rover 120 also includes the communications transceiver 126 and the antenna 128. The base station 130 transmits the communications signal 131 (for example, a radiofrequency signal) from the antenna 138. The rover 120 receives the communications signal 131 at the antenna 128.

From the received navigation signals, the navigation receiver 132 at the base station 130 can calculate corrections to the received GNSS measurements with respect to the known position of the base station 130. In some DN systems, raw measurements of the base station can serve as corrections. If the distance between the base station 130 and the rover 120 is relatively small, then many of the errors at the base station 130 and at the rover 120 are correlated. The base station 130 transmits error correction data to the rover 120 via the communications signal 131. The error correction data includes data that can be used to correct errors from the various error sources discussed above, for example. The rover 120 processes the navigation signals and the error correction data to determine the position of the rover 120. The accuracy with which the rover 120 can determine its position in the differential navigation mode is higher than the accuracy with which the GNSS measurement unit 110 can determine its position in the stand-alone mode.

A DN system that broadcasts correction data to pseudo-ranges is often referred to as a differential global positioning system (DGPS), or a differential global navigation satellite system (DGNSS). The position determination accuracy of a DN system can be further improved if the pseudo-ranges measured with code phase are supplemented with the pseudo-ranges measured with carrier phase.

If the carrier phases of the signals transmitted by the same satellites are measured by both the navigation receiver in the base station and the navigation receiver in the rover, processing the two sets of carrier phase measurements can yield a location determination accuracy to within several percent of the carrier's wavelength. A DN system that determines positions based on real-time carrier phase pseudo-range measurements, in addition to the code phase pseudo-range measurements, is often referred to as a real-time kinematic (RTK) system. Processing carrier phase measurements to determine position includes the step of ambiguity resolution; that is, determining the integer number of cycles in the carrier signal received by the navigation receiver from an individual satellite.

More complex DN systems, including RTK systems, are configured as network DN systems. In a network DN system, error correction data for a rover is generated from measurements collected from a group of base stations that are geographically dispersed over a wide area. A network control center processes the measurements from the group of base stations and transmits the error correction data to the rover via various communications links, such as radiofrequency satellite signals or General Packet Radio Service (GPRS). Network DN systems can differ by application areas and target positioning accuracy.

FIG. 1B shows an example of a regional (local) network DN system used to provide a network RTK solution; such systems are often referred to as Network RTK systems. Shown are the rover 190 and four representative base stations, denoted base station 180A—base station 180D. The rover 190 includes the antenna 194 and the navigation receiver 192. The antenna 194 receives navigation signals, such as navigation signal 103A—navigation signal 103F. The rover 190 also includes the communications transceiver 196 and the antenna 198. The base station 180A includes the navigation receiver 182A, the antenna 184A, and the data processing and communications unit 186A; base station 180B—base station 180D are each similar to the base station 180A.

In general, the rover and each base station can receive navigation signals from a slightly different subset of navigation satellites in the constellation 102, dependent on observation specifics at the rover and at each base station. Operation of the rover in a RTK mode is possible, however, only using satellite signals received simultaneously by the rover 190 and by the base stations 180A-180D.

Base station 180A—base station 180D transmit data 181A—data 181D, respectively, to the network control center (NCC) 1100. The data can be transmitted via communications links or via a communications network. The NCC 1100 includes the communications transceiver 1102, the antenna 1104, and the data processing and communications unit 1106. The NCC 1100 receives the data from the base stations as well as the approximate position of the rover and processes these data according to specific algorithms to generate a consolidated set of error correction data corresponding to the rover position (described in more detail below).

The NCC 1100 makes the consolidated set of error correction data available to the rover via various communication channels, such as GPRS. In FIG. 1B, the NCC 1100 delivers the consolidated set of error correction data via the communications signal 1101 (for example, a radiofrequency signal) transmitted from the antenna 1104. The rover 190 receives the communications signal 1101 at the antenna 198. The rover 190 then calculates its position based on measurements collected with its receiver and the consolidated set of error correction data.

The consolidated set of error correction data in network RTK systems can be partitioned into a few groups. The consolidated set of error correction data can include:
  Cumulative corrections to both code phase and carrier phase measurements from one or more individual base stations in a group of base stations;
  Corrections to code phase and carrier phase measurements for a virtual base station generated from processing GNSS measurements for a group of base stations;
  Corrections representing the dispersive part of GNSS measurement errors (measurement errors attributable to the ionosphere) for measurements from one or more individual base stations in a group of base stations;
  Corrections representing the non-dispersive part of GNSS measurement errors (measurement errors attributable to the troposphere, satellite ephemeris, and satellite clock data) for measurements from one or more individual base stations in a group of base stations;
  Coefficients approximating how various GNSS measurement error components change in space; and
  Other servicing information.

Figure 1C:
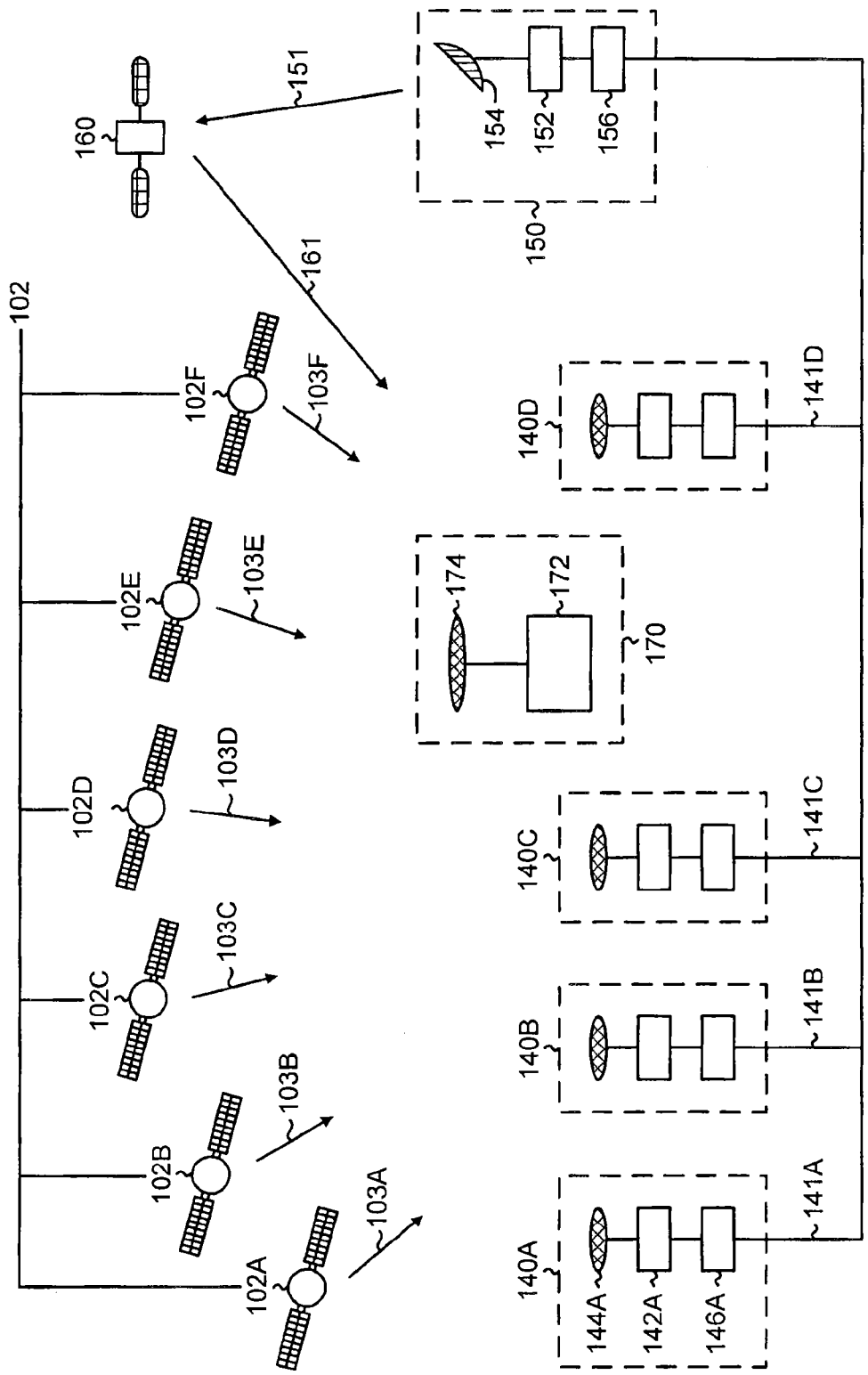
FIG. 1C shows an example of a global navigation satellite system in which the navigation receiver operates in a satellite-based network differential navigation mode.

FIG. 1C shows another example of a network DN system, referred to as a Space Based Augmentation System (SBAS). Shown are the rover 170 and four representative base stations, denoted base station 140A—base station 140D. The rover 170 includes the antenna 174 and the navigation receiver 172. The base station 140A includes the navigation receiver 142A, the antenna 144A, and the data processing and communications unit 146A; base station 140B—base station 140D are each similar to the base station 140A. In general, the rover and each base station can receive navigation signals from a slightly different subset of navigation satellites in the constellation 102, dependent on the specific navigation satellites in view at the rover and at each base station. Operation of the rover in a differential mode is possible, however, only using satellite signals received simultaneously by the rover 170 and by the base stations 140A-140D.

Base station 140A—base station 140D transmit data 141A—data 141D, respectively, to the network control center (NCC) 150. The data can be transmitted via communications links or via a communications network. The NCC 150 includes the satellite transmitter 152, the antenna 154, and the data processing and communications unit 156. The NCC 150 receives the data from the base stations and processes the data according to specific algorithms to generate a consolidated set of error correction data (described in more detail below). The NCC 150 transmits the consolidated set of error correction data to the geosynchronous (geostationary) relay satellite 160 via the satellite uplink channel 151.

The geosynchronous relay satellite 160 then retransmits the consolidated set of error correction data over a specific region (zone) of the Earth. Multiple geosynchronous relay satellites provide coverage for multiple zones. In FIG. 1B, the rover 170 receives the consolidated set of error correction data from the geosynchronous relay satellite 160 via the satellite signal 161. The rover 170 then calculates its position from the navigation signals and the consolidated set of error correction data. Note that the navigation receiver 172 in the rover 170 needs to be specially equipped to process the satellite signal 161.

The consolidated set of error correction data can be partitioned into a few groups. The consolidated set of error correction data can include:
  Corrections to code phase measurements from one or more individual base stations in a group of base stations;
  Corrections to both code phase and carrier phase measurements from one or more individual base stations in a group of base stations;
  Corrections to orbital (trajectory) parameters and clock parameters of GNSS satellites, specified in the processing of measurements from a group of base stations;
  Corrections to code phase measurements for a virtual base station generated from processing GNSS measurements for a group of base stations;
  Corrections to code phase and carrier phase measurements for a virtual base station generated from processing GNSS measurements for a group of base stations; and
  Other error correction data.

A third example of a network DN system, referred to as Precise Point Positioning (PPP), is similar to network RTK in some aspects, but correction data is presented differently. The architecture of the PPP system is identical to that of the SBAS. Referring to FIG. 1C, a PPP system includes a network of base stations 140A-140D distributed regionally or globally. They send their data to the network control center (NCC) 150. The NCC 150 receives the data from the base stations and processes the data according to specific algorithms to generate a consolidated set of error correction data (described in more detail below). As one option, the NCC 150 can transmit the consolidated set of error correction data to the geosynchronous (geostationary) relay satellite 160 via the satellite uplink channel 151. In another option, the NCC 150 can make the consolidated set of error correction data available to a rover via the Internet.

The key distinction between the PPP system and the typical SBAS, despite similarity in infrastructure, is better accuracy. The SBAS can provide positioning accuracy, on the order of a meter or better; whereas, the PPP system is capable of delivering decimeter level positioning accuracy. In certain cases, PPP correction data sets can make possible carrier phase ambiguity resolution, thus leading to centimeter level positioning accuracy (similar to RTK).

The consolidated set of error correction data in a PPP system can be partitioned into a few groups. The consolidated set of error correction data can include:
  Corrections to orbital (trajectory) parameters of GNSS satellites specified in the processing of measurements from a group of base stations;
  Corrections to clock parameters of GNSS satellites, specified in the processing of measurements from a group of base stations;
  Corrections for residual uncompensated errors of GNSS measurements; and
  Other error correction data.

Each navigation satellite in a global navigation satellite system can transmit navigation signals on one or more frequency bands (for example, on the L1, L2, and L5 frequency bands). To simplify the terminology herein, a navigation receiver is also referred to simply as a receiver.

A single-band receiver receives and processes signals on one frequency band (such as L1); a multi-band receiver receives and processes signals on two or more frequency bands (such as L1, L2, and L5). A single-system receiver receives and processes signals from a single GNSS (such as GPS); a multi-system receiver receives and process signals from two or more GNSSs (such as GPS, GLONASS, and GALILEO).

Figure 2:
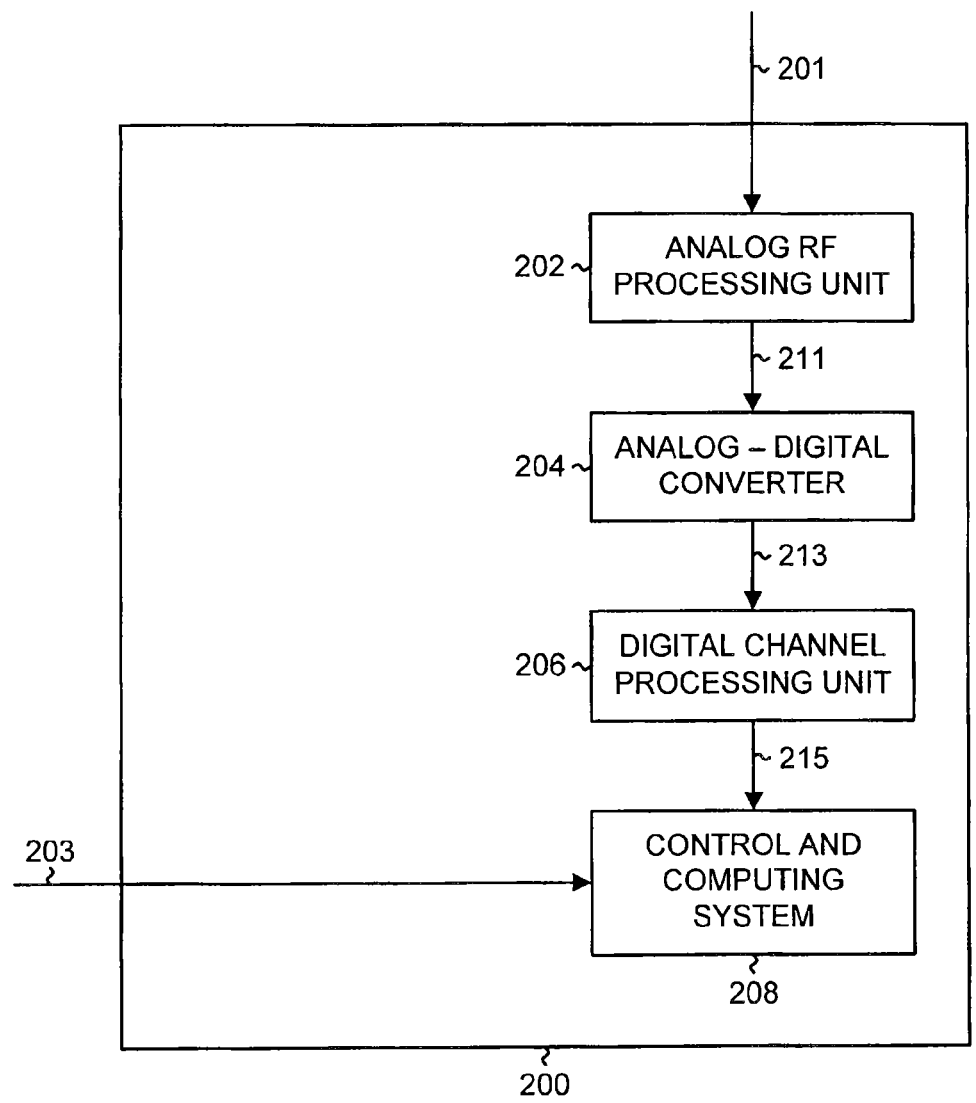
FIG. 2 shows a high-level schematic functional block diagram of a navigation receiver.

FIG. 2 shows a high-level schematic functional block diagram of an example of a receiver, denoted as the receiver 200. The input analog signal 201 represents the total signal (also referred to as the combined signal, aggregate signal, or composite signal) of all the navigation signals received by the antenna (not shown) coupled to the receiver 200. For the example shown in FIG. 1A, the input analog signal 201 includes the navigation signal 103A—navigation signal 103F. The input analog signal 201 is first inputted into the analog radiofrequency (RF) processing unit 202. In the analog RF processing unit 202, the input analog signal 201 is amplified by a low-noise amplifier, filtered by a RF bandpass filter, and mixed with a local oscillator signal to generate an intermediate signal with an upconverted frequency and an intermediate signal with a downconverted frequency. An intermediate frequency bandpass filter removes the intermediate signal with the upconverted frequency and outputs the intermediate signal with the downconverted frequency; this output signal is denoted as the output analog signal 211.

The output analog signal 211 is inputted into the analog-digital converter (ADC) 204, which digitizes the analog signal 211. The output digital signal 213 is then inputted into the digital channel processing unit 206, which processes navigation data used for solving navigation tasks. The navigation data includes GNSS information (such as satellite ephemeris and satellite clock parameters) encoded on the navigation signals. The navigation data also includes code phase measurements (that is, delay times used to determine pseudo-ranges) calculated from delay-locked loops (DLLs). If the navigation receiver processes carrier phases, the navigation data also includes carrier phase measurements calculated from phase-locked loops (PLLs).

The output digital signal 215 is inputted into the control and computing system 208, which computes target parameters such as position, velocity, and time offset. If the receiver operates in a differential navigation mode, the control and computing system 208 receives the error correction data 203, used to compute target parameters with better accuracy. In the single-base-station DN system shown in FIG. 1A, the error correction data 203 would be received from the communications transceiver 126 in the rover 120. In the network DN system shown in FIG. 1B, the error correction data would be received from the communications transceiver 196 in the rover 190. In the network DN system shown in FIG. 1C, the error correction data 203 would be received from the satellite signal 161.

An embodiment of the control and computing system 208 is shown in FIG. 3. One skilled in the art can construct the control and computing system 208 from various combinations of hardware, firmware, and software. One skilled in the art can construct the control and computing system 208 from various electronic components, including one or more general purpose processors (such as microprocessors), one or more digital signal processors, one or more application-specific integrated circuits (ASICs), and one or more field-programmable gate arrays (FPGAs).

The control and computing system 208 includes a computer 302, which includes a processor [referred to as the central processing unit (CPU)] 304, memory 306, and a data storage device 308. The data storage device 308 includes at least one persistent, non-transitory, tangible computer readable medium, such as non-volatile semiconductor memory, a magnetic hard drive, or a compact disc read only memory.

The control and computing system 208 further includes a user input/output interface 310, which interfaces the computer 302 to user input/output devices 312. Examples of user input/output devices 312 include a keyboard, a mouse, a local access terminal, and a video display. Data, including computer executable code, can be transferred to and from the computer 302 via the user input/output interface 310.

The control and computing system 208 further includes a communications network interface 320, which interfaces the computer 302 with a communications network 322. Examples of the communications network 322 include a local area network and a wide area network. A user can access the computer 302 via a remote access terminal (not shown) communicating with the communications network 322. Data, including computer executable code, can be transferred to and from the computer 302 via the communications network interface 320.

The control and computing system 208 further includes a digital channel processing unit interface 330, which interfaces the computer 302 with the digital channel processing unit 206 (see FIG. 2).

The control and computing system 208 further includes a communications transceiver interface 340, which interfaces the computer 302 with a communications transceiver, such as the communications transceiver 126 (see FIG. 1A) or the communications transceiver 196 (see FIG. 1B).

As is well known, a computer operates under control of computer software, which defines the overall operation of the computer and applications. The CPU 304 controls the overall operation of the computer and applications by executing computer program instructions that define the overall operation and applications. The computer program instructions can be stored in the data storage device 308 and loaded into the memory 306 when execution of the program instructions is desired. The algorithms described below can be defined by computer program instructions stored in the memory 306 or in the data storage device 308 (or in a combination of the memory 306 and the data storage device 308) and controlled by the CPU 304 executing the computer program instructions. For example, the computer program instructions can be implemented as computer executable code programmed by one skilled in the art to perform algorithms. Accordingly, by executing the computer program instructions, the CPU 304 executes the algorithms described below.

Refer back to FIG. 1A. As navigation signals, such as navigation signal 103A—navigation signal 103F, propagate from navigation satellites, such as navigation satellite 102A—navigation satellite 102F, they propagate through the ionosphere en route to the Earth. Local irregularities of electron concentration in the ionosphere caused by increased solar activity can lead to delay and scattering of radio signals, and consequently, to fluctuations (scintillations) in signal amplitude and phase. Scintillations can affect any radio signal travelling through the ionosphere; in particular, scintillations can affect GNSS signals.

For GNSS applications, scintillations can be categorized into three categories, depending on their strength:
1) Strong scintillations lead to the loss of a GNSS signal;
2) Moderate scintillations lead to noticeable degradation of positioning accuracy (that is, the resulting errors are significant with respect to specific user tolerances); and 3) Weak scintillations lead to only slight (or even unnoticeable) degradation of positioning accuracy (that is, the resulting errors are not significant with respect to specific user tolerances).

Described herein are methods and apparatus for detecting scintillations under the following conditions:
1) Scintillations are moderate: GNSS signals are distorted, but still tracked, and GNSS measurements are generated;
2) Pseudo-range GNSS measurements (code phase or carrier phase) are available on at least two frequencies.

Also described herein are methods and apparatus for mitigating the effects of scintillations on target parameters, such as position, velocity, and time, calculated from GNSS measurements.

In an embodiment of the invention, a scintillation is detected based on the value of a parameter referred to herein as the geometry-free combination (GFC) parameter. The equation used for calculating the GFC parameter depends on the operational mode of the navigation receiver (stand-alone or differential navigation) and on the type of measurements processed by the navigation receiver (code phase pseudo-range measurement or carrier phase pseudo-range measurement). There are therefore four configurations (combinations of operational mode and measurement type), which are described below.

Configuration 1.

The navigation receiver operates in a stand-alone mode and processes code phase pseudo-range measurements. In this configuration, the generalized model of GNSS code phase pseudo-range measurements is described by the following equations:

$$D_1 = c\tau_1 + R + I + \xi_1; \qquad (E1)$$

and $$D_2 = c\tau_2 + R + I\frac{f_1^2}{f_2^2} + \xi_2; \qquad (E2)$$

where:
$D_1$, $D_2$ are the code phase pseudo-range measurements at carrier frequency 1 and carrier frequency 2, respectively;
C is the speed of light;
$\tau_1$, $\tau_2$ are the offsets between the receiver and GNSS time scales at carrier frequency 1 and carrier frequency 2, respectively;
R is the geometric (true) distance between the GNSS receiver antenna and the GNSS satellite antenna;
I is the ionospheric delay at carrier frequency 1;
$f_1$, $f_2$ are the nominal values of carrier frequency 1 and carrier frequency 2, respectively; and
$\xi_1$, $\xi_2$ represent the cumulative effects of various uncompensated errors and unmodelled factors at carrier frequency 1 and carrier frequency 2, respectively. Examples of uncompensated errors and unmodelled factors include ephemeris errors, tropospheric factors, receiver noise, and multipath.

Note that a navigation signal transmitted on carrier frequency 1 and a navigation signal transmitted on carrier frequency 2 by the same navigation satellite are considered to be two separate navigation signals. The above equations apply independently for navigation signals from each navigation satellite in view. To simplify the notation, the index of the navigation satellite has been omitted; similarly, the index of the navigation satellite has been omitted from (E3)-(E27) below.

A parameter referred to herein as the geometry-free combination (GFC) parameter is then determined from the following equation:

$$GFC=(D_1-D_2)/(1-\mu), \qquad (E3)$$

where $$\mu=f_1^2/f_2^2 \qquad (E4)$$

is the ratio of the frequencies squared. The value of the GFC parameter provides an estimate of a value of signal delay caused by propagation through the ionosphere, as can be seen by substituting (E1) and (E2) in (E3):

$$\begin{aligned} GFC &= (D_1 - D_2)/(1 - \mu) \\ &= I + (c\tau_1 - c\tau_2 + \xi_1 - \xi_2)/(1 - \mu) \\ &= I + \xi_3, \end{aligned} \qquad (E5)$$

where $\xi_3$ represents the cumulative effect of various uncompensated errors and unmodelled factors to the estimation of ionospheric delay at carrier frequency 1. From (E5), it is clear that GFC is an estimate of the ionospheric signal delay at carrier frequency 1 (I), within an accuracy determined by $\xi_3$.

As discussed above, a pseudo-range measurement calculated from GNSS signals provides an estimate of the true (geometric) distance between a navigation satellite and a navigation receiver. The pseudo-range measurements are functions of the geometric distance, clock offset between the receiver clock and the GNSS system time, and various error components. When pseudo-range measurements on two or more frequencies are available, various combinations of the pseudo-range measurements on different frequencies can be formed. These combinations have different properties. In the geometry-free combination (GFC parameter), the geometric distances, tropospheric delays, satellite clock errors, and other factors common for any two frequencies are cancelled. The ionospheric influence remains and can be estimated with the GFC parameter.

Configuration 2.

The navigation receiver operates in a differential navigation mode and processes code phase pseudo-range measurements. In this configuration, the generalized model of GNSS code phase pseudo-range measurements is described by the following equations:

$$\Delta D_1 = c\Delta\tau_1 + \Delta R + \Delta I + \eta_1; \qquad (E6)$$

and $$\Delta D_2 = c\Delta\tau_2 + \Delta R + \Delta I\frac{f_1^2}{f_2^2} + \eta_2; \qquad (E7)$$

where:
$\Delta D_1$, $\Delta D_2$ are the code phase pseudo-range differences between the base and the rover at carrier frequency 1 and carrier frequency 2, respectively;
$\Delta\tau_1$, $\Delta\tau_2$ are the differences between the base and the rover time scales at carrier frequency 1 and carrier frequency 2, respectively;

ΔR is the difference of the geometric (true) distances between the base antenna and the rover antenna with respect to a GNSS satellite antenna;

ΔI is the ionospheric delay difference between the base and the rover at carrier frequency 1;

$\eta_1$, $\eta_2$ represent the cumulative effects of various uncompensated errors and unmodelled factors at carrier frequency 1 and carrier frequency 2, respectively.

In this configuration, the GFC parameter is determined from the following equation:

$$GFC = (\Delta D_1 - \Delta D_2)/(1-\mu). \quad (E8)$$

Substitution of (E6) and (E7) into (E8) then yields:

$$GFC = (\Delta D_1 - \Delta D_2)/(1-\mu) \quad (E9)$$
$$= I + \eta_3,$$

where $\eta_3$ represents the cumulative effect of various uncompensated errors and unmodelled factors on the estimation of ionospheric delay difference between the base and the rover at carrier frequency 1. From (E9), it is clear that GFC is an estimate of the ionospheric signal delay difference at carrier frequency 1 ($\Delta I$), within an accuracy determined by $\xi_3$.

Configuration 3.

The navigation receiver operates in a stand-alone mode and processes carrier phase pseudo-range measurements. In this configuration, the generalized model of GNSS carrier phase pseudo-range measurements is described by the following equations:

$$\varphi_1 = c\tau_1 + R - I + \lambda_1 N_1 + v_1; \quad (E10)$$
and
$$\varphi_2 = c\tau_2 + R - I\frac{f_1^2}{f_2^2} + \lambda_2 N_2 + v_2; \quad (E11)$$

where:

$\phi_1$, $\phi_2$ are the carrier phase pseudo-range measurements at carrier frequency 1 and carrier frequency 2, respectively;

$\lambda_1$, $\lambda_2$ are the wavelengths corresponding to carrier frequency 1 and carrier frequency 2, respectively;

$N_1$, $N_2$ are the integer ambiguity values for measurements at carrier frequency 1 and carrier frequency 2, respectively; and $v_1$, $v_2$ represent the cumulative effects of various uncompensated errors and unmodelled factors at carrier frequency 1 and carrier frequency 2, respectively.

In this configuration, the GFC parameter is determined from the following equation:

$$GFC = (\phi_1 - \phi_2)/(\mu - 1). \quad (E12)$$

Substitution of (E10) and (E11) into (E12) then yields:

$$GFC = (\varphi_1 - \varphi_2)/(\mu - 1) \quad (E13)$$
$$= -I + (c\tau_1 - c\tau_2 + v_1 - v_2 + \lambda_1 N_1 - \lambda_2 N_2)/(\mu - 1)$$
$$= -I + v_3,$$

where $v_3$ represents the cumulative effect of various uncompensated errors and unmodelled factors, including integer ambiguities, on the estimation of ionospheric delay at frequency 1. From (E13), it is clear that GFC provides an estimate of the ionospheric signal delay for carrier frequency 1 ($I$), within an accuracy determined by $v_3$. Note that the sign of the estimate in (E13) is opposite to the sign of the estimate in (E5) due to the different impact of the ionosphere on signal group and signal phase velocities.

Configuration 4.

The navigation receiver operates in a differential navigation mode and processes carrier phase pseudo-range measurements [that is, the navigation receiver operates in the real-time kinematic (RTK) mode]. In this configuration, the generalized model of GNSS carrier phase pseudo-range measurement differences is given by the following equations:

$$\Delta\varphi_1 = c\Delta\tau_1 + \Delta R - \Delta I + \lambda_1 \Delta N_1 + \varepsilon_1; \quad (E14)$$
and
$$\Delta\varphi_2 = c\Delta\tau_2 + \Delta R - \Delta I \frac{f_1^2}{f_2^2} + \lambda_2 \Delta N_2 + \varepsilon_2; \quad (E15)$$

where:

$\Delta\phi_1$, $\Delta\phi_2$ are the carrier phase pseudo-range differences between the base and the rover at carrier frequency 1 and carrier frequency 2, respectively;

$\Delta N_1$, $\Delta N_2$ are the integer ambiguity differences between the base and the rover at carrier frequency 1 and carrier frequency 2, respectively; and $\epsilon_1$, $\epsilon_2$ represent the cumulative effects of various uncompensated errors and unmodelled factors at carrier frequency 1 and carrier frequency 2, respectively.

In this configuration, the GFC is determined from the following equation:

$$GFC = (\Delta\phi_1 - \Delta\phi_2)/(\mu - 1). \quad (E16)$$

Substitution of (E14) and (E15) into (E16) then yields:

$$GFC = (\Delta\varphi_1 - \Delta\varphi_2)/(\mu - 1) \quad (E17)$$
$$= -\Delta I + \left( \begin{array}{c} c\Delta\tau_1 - c\Delta\tau_2 + \varepsilon_1 - \\ \varepsilon_2 + \lambda_1 \Delta N_1 - \lambda_2 \Delta N_2 \end{array} \right) / (\mu - 1)$$
$$= -\Delta I + \varepsilon_3,$$

where $\epsilon_3$ represents the cumulative effect of various uncompensated errors and unmodelled factors, including integer ambiguities differences, on the estimation of ionospheric delay difference at carrier frequency 1. From (E17), it is clear that GFC provides an estimate of the ionospheric delay difference between the base and the rover at carrier frequency 1 ($\Delta I$), with an accuracy determined by $v_3$.

In summary, the value of the GFC parameter for four different configurations (combinations of operational mode and measurement type) is determined from (E3), (E8), (E12), and (E16). For a stand-alone mode (Configuration 1 and Configuration 3), the value of the GFC parameter represents an estimate of the ionosphere delay and an error component; the error component has a noise-like portion and a systematic portion. For a differential navigation mode (Configuration 2 and Configuration 4), the value of the GFC parameter represents an estimate of the ionospheric delay difference between the base and the rover and an error component; the error component has a noise-like portion and a systematic portion. The systematic portion includes the impact of carrier phase integer ambiguities. For those configurations in which carrier phase measurements are used (Configuration 3 and Configuration 4), the systematic portion includes the impact of carrier phase integer ambiguities.

To simplify the terminology, the term "input GNSS measurement" refers to any one of the following:

Code phase pseudo-range measurement D (between a navigation satellite and a navigation receiver)

Code phase pseudo-range difference ΔD (difference between a first code phase pseudo-range and a second code phase pseudo-range, where the first code phase pseudo-range is the code phase pseudo-range between a navigation satellite and a first navigation receiver in a rover, and the second code phase pseudo-range is the code phase pseudo-range between the same navigation satellite and a second navigation receiver in a base)

Carrier phase pseudo-range measurement φ (between a navigation satellite and a navigation receiver)

Carrier phase pseudo-range difference Δφ (difference between a first carrier phase pseudo-range and a second carrier phase pseudo-range, where the first carrier phase pseudo-range is the carrier phase pseudo-range between a navigation satellite and a first navigation receiver in a rover, and the second carrier phase pseudo-range is the carrier phase pseudo-range between the same navigation satellite and a second navigation receiver in a base).

The geometry-free combination parameter for all four instances of input GNSS measurements can then be expressed as:

$$GFC = (L_1 - L_2)/(1-\mu). \quad (E18)$$

where:
$L_1$ are input GNSS measurements on carrier frequency 1;
$L_2$ are input GNSS measurements on carrier frequency 2; and
$\mu = f_1^2/f_2^2$, where $f_1$ is the nominal value of carrier frequency 1 and $f_2$ is the nominal value of carrier frequency 2.

Input GNSS measurements are a function of time. Typically, input GNSS measurements are calculated at discrete time instants, referred to as epochs. In an embodiment of the invention, the dispersion of the GFC parameter is used for detecting scintillations. Here "dispersion" refers to a generic statistical metric that characterizes the variation of the GFC parameter over a specified time interval. For example, the dispersion can be calculated for a set of input GNSS measurements corresponding to time instants over a moving time interval (time window) with a fixed width ΔT. As a new input GNSS measurement is received, the oldest input GNSS measurement is removed from the set, the new input GNSS measurement is added to the set, and the dispersion is re-calculated. If the value of the dispersion exceeds a specified threshold value, then a scintillation is detected.

Various statistical functions, such as variance, standard deviation, mean difference, mean absolute deviation (MAD), and inter-quartile range, can be used to represent the dispersion. In an embodiment of the invention, the value of the standard deviation of the GFC parameter is used for detecting scintillations. For real-time applications, a recursive method can be used for estimating the value of the standard deviation of the GFC parameter:

$$\overline{GFC}_i = \overline{GFC}_{i-1} + (GFC_i - \overline{GFC}_{i-1})/n_i; \quad (E19)$$

$$GFD_i = GFD_{i-1} + ((GFC_i - \overline{GFC}_{i-1})^2 - GFD_{i-1})/n_i; \quad (E20)$$

and $$GFS_i = \sqrt{GFD_i}; \quad (E21)$$

where:
$GFC_i$ is the value of the geometry-free combination parameter at the i-th step, where i is an integer index 1;
$\overline{GFC}$ is the estimate of the mathematical expectation of the GFC;
GFD is the estimate of the variance of the GFC;
GFS is the estimate of the standard deviation of the GFC;

$$n_i = \begin{Bmatrix} i; \; i \le Nlim \\ Nlim; \; i > Nlim \end{Bmatrix}$$

is an averaging constant; and
Nlim is the limiting value for the averaging constant.

The limiting value for the averaging constant is selected based on knowledge of the scintillation statistics and measurement noise values of the navigation receiver in use. In an embodiment, values for Nlim are determined from a sampling interval of approximately 20 to 100 seconds. For example, if ΔT is the sampling interval and Δt is the period for one step, then Nlim=ΔT/Δt, with ΔT equal to approximately 20 to 100 seconds. The period for one step, Δt, for example, can be one epoch, and the index i can correspond to a particular epoch.

In an embodiment of the invention, the following criterion is used for detecting a scintillation. A scintillation is detected when the following inequality is satisfied for measurements from at least one navigation satellite:

$$GFS_i > Lim, \quad (E22)$$

where Lim is a specified threshold value. The value of Lim is selected depending on knowledge of scintillation statistics and measurement error values of the navigation receiver in use. As one example, the value of Lim is selected to be about 2 cm (for Configuration 4 above) or greater.

Measurements based on signals from low-elevation navigation satellites are susceptible to increased multipath errors. In addition to direct, line-of-sight, signals transmitted from navigation satellites, a navigation receiver can also receive signals transmitted from navigation satellites and reflected one or more times from environmental surfaces such as ground and water and from surfaces of obstacles such as buildings. These multipath signals, when processed with the direct signals, can result in errors in determining position. These multipath errors can also trigger false alarms in the scintillation detection algorithm. In an embodiment of the invention, to minimize false alarms arising from multipath errors, one or both of the following methods are used:

1) Reject measurements from low-elevation satellites;
2) Weight every measurement in accordance with satellite elevation.

Since scintillations mostly affect higher elevation satellites, measurements from low-elevation satellites can be rejected from the scintillation detection algorithm if the satellite elevation is below a specified threshold value; as one example, the specified threshold value is 20°. Satellite elevation is commonly measured as an angle above the horizon (0° corresponds to the horizon; 90° corresponds to the zenith).

Weights can be incorporated into the scintillation detection algorithm according to the following equation:

$$GFD_i = GFD_{i-1} + ((GFC_i - \overline{GFC}_{i-1})^2 \times w_i - GFD_{i-1})/n_i, \quad (E23)$$

where $w_i$ is a weight. In general, the weight $w_i$ is a specified function of $elv_i$, which is the satellite elevation angle above the horizon at the i-th step. Various specified functions can be used for $w_i$; for example $$w_i = \sin(elv_i); \qquad (E24)$$

or $$w_i = (\sin(elv_i))^2. \qquad (E25)$$

When carrier phase measurements are used for detecting scintillations, cycle slips can be encountered. Cycle slips are rapid changes in the measured carrier phases, resulting from errors in the tracking loop (phase-locked loop) caused by sources such as signal interference and multipath reception. When a cycle slip occurs, the estimated GFS can be incorrect.

In an embodiment of the invention, cycle slips are detected and isolated; that is, a measurement corrupted by a cycle slip can be removed from further processing or assigned a proportionally low weight. For example, the difference $(GFC_i - \overline{GFC}_{i-1})$ is monitored. A cycle slip is detected when the following inequality is satisfied for measurements from at least one navigation satellite:

$$(GFC_i - \overline{GFC}_{i-1}) > \text{LimDiff}, \qquad (E26)$$

where LimDiff is a specified threshold value. The value of LimDiff is selected depending on wavelength. As one example, the value of LimDiff is selected to be about half a wavelength. For the GPS L1 frequency, LimDiff is about 10 cm. If a cycle slip is detected, then $n_i$ in (E19), (E20), or (E23) is reset to 1; with $n_i=1$, there is no averaging or smoothing. Reset is performed only for those satellites having corresponding detected cycle slips.

Ionospheric impact can be excluded if measurements made at two or more frequencies are available. Exclusion of ionospheric impact with dual frequency measurements is based on forming the so-called ionosphere-free combination of measurements (IFC parameter):

$$\text{IFC} = (L_2 - \mu L_1)/(1-\mu), \qquad (E27)$$

where, as defined above in reference to (E18):
 $L_1$ are input GNSS measurements on carrier frequency 1;
 $L_2$ are input GNSS measurements on carrier frequency 2; and
 $\mu = f_1^2/f_2^2$, where $f_1$ is the nominal value of carrier frequency 1, and
 $f_2$ is the nominal value of carrier frequency 2.

Target parameters (such as position, velocity, and time) can be calculated from IFC parameters from a sufficiently large number of satellites. The algorithms for calculating target parameters from IFC parameters are well known in the art and are not described herein.

Compared to calculating the target parameters directly from the input GNSS measurements, calculating target parameters from IFC parameters has the advantage of excluding ionospheric biases but the disadvantage of increased noise. If the ionospheric biases are significantly larger than the noise, as is the case when scintillations occur, then calculating target parameters from IFC parameters yields overall better accuracy. Embodiments of the invention described below determine the conditions under which calculation of target parameters from IFC parameters are favorable and the conditions under which calculation of target parameters from the input GNSS measurements are favorable.

Figure 4A:
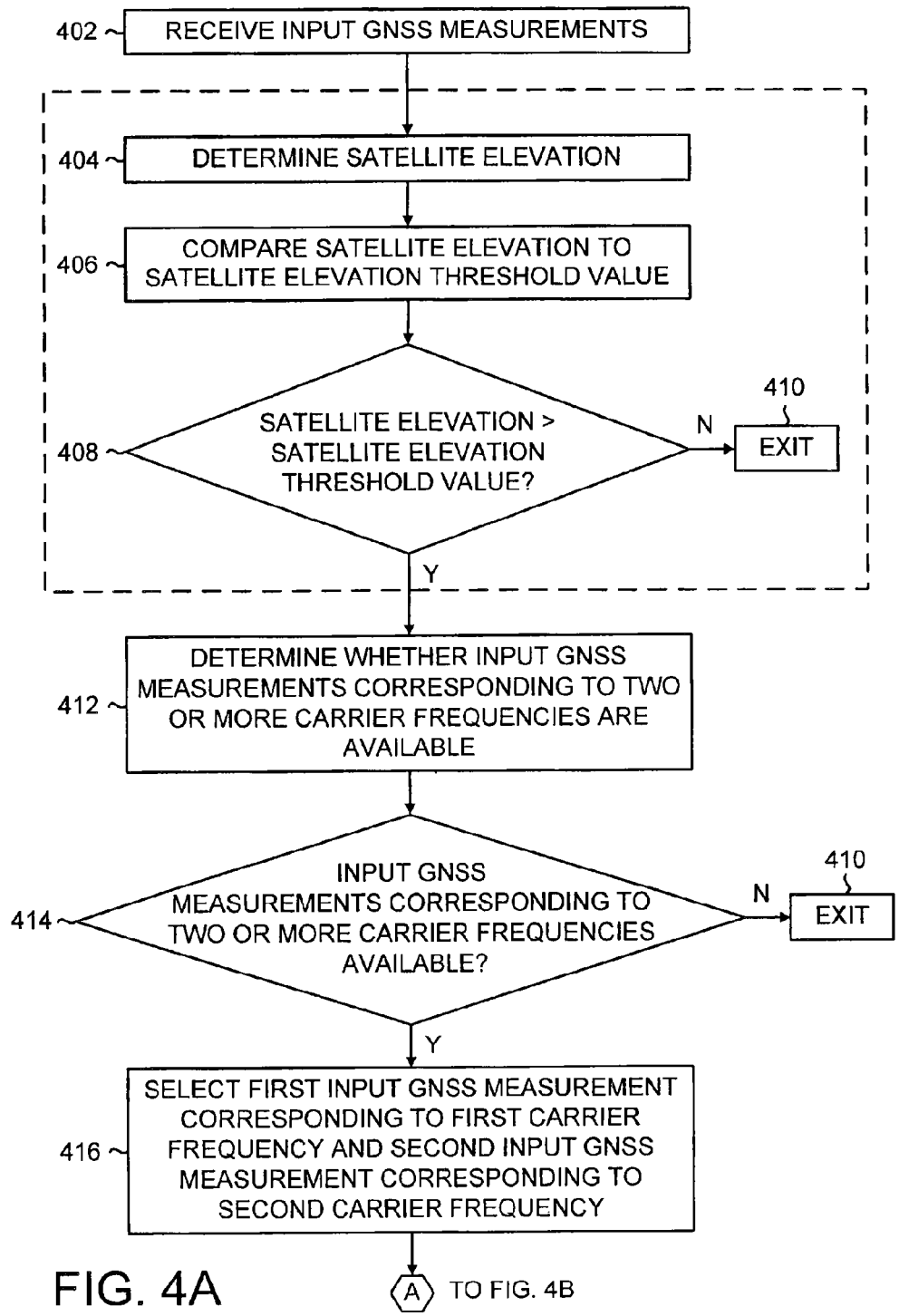
FIG. 4A-FIG. 4C show a flowchart of a method for detecting scintillations caused by ionospheric irregularities.
Figure 4B:
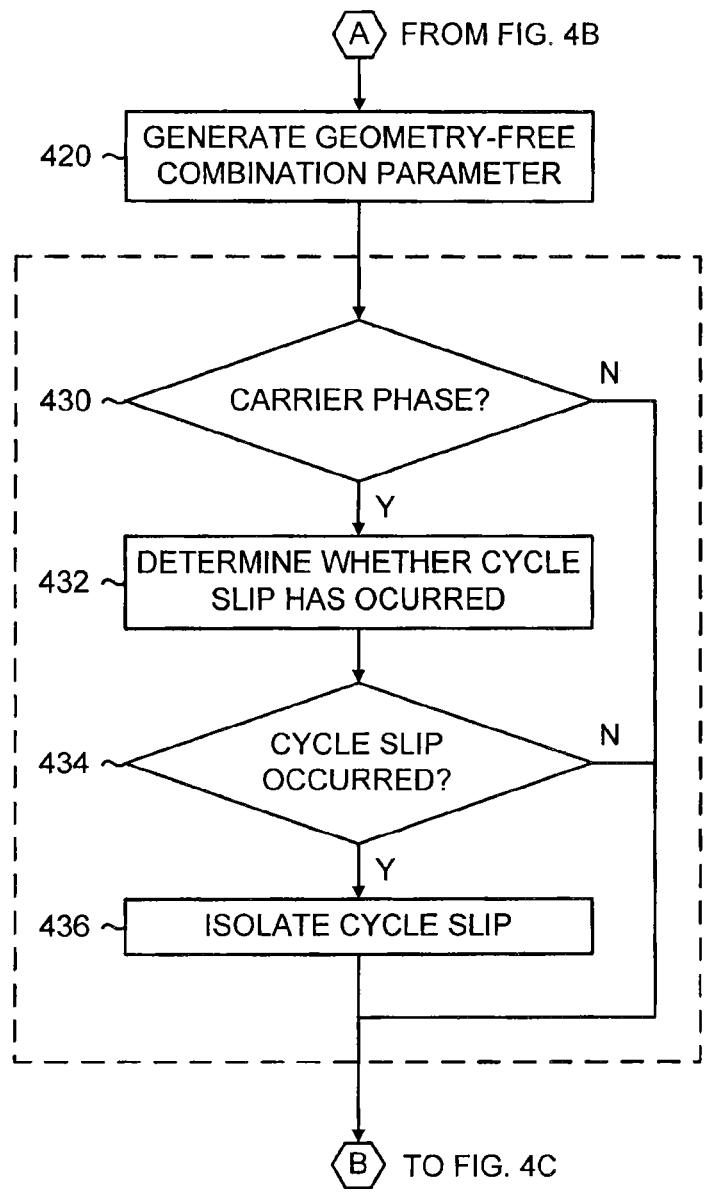
Figure 4C:
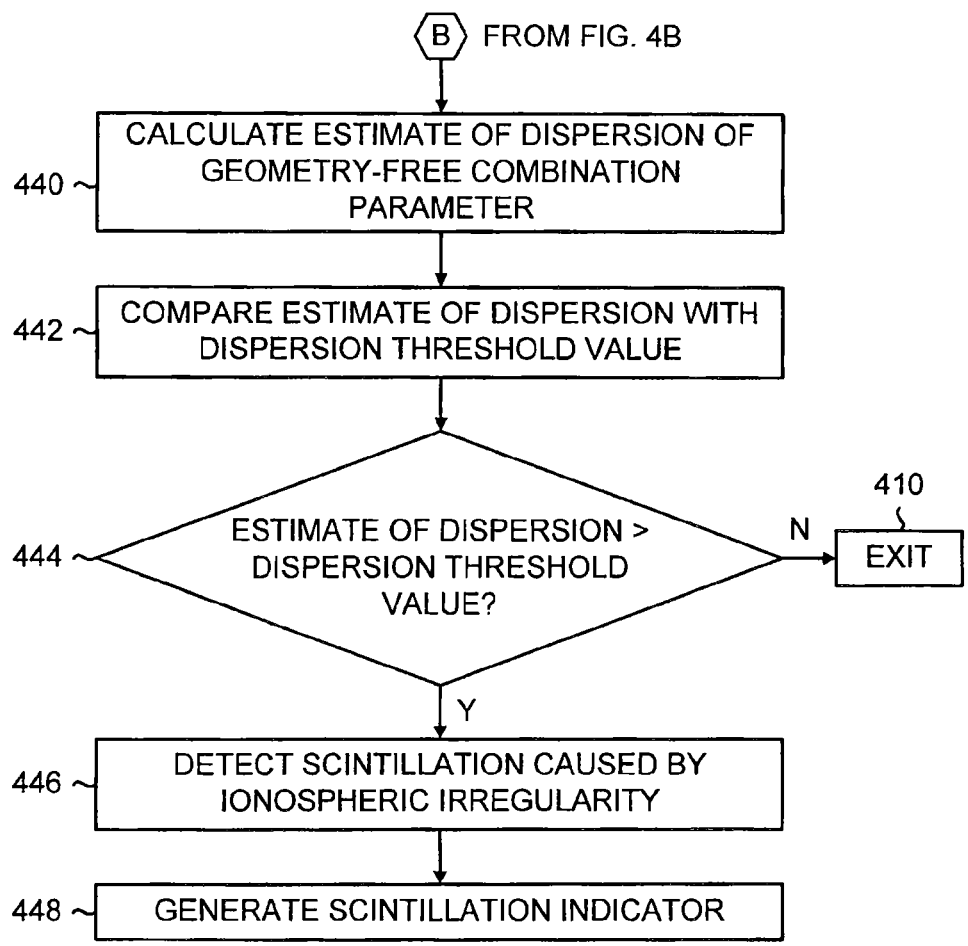

The flowchart shown in FIG. 4A-FIG. 4C summarize an embodiment of a method for detecting a scintillation caused by an ionospheric irregularity for a specific navigation satellite. [In FIG. 4A-FIG. 4C, the indices "A" and "B" enclosed in a hexagon are used only to assist in aligning the sections of the flowchart. They do not refer to drawing elements; they are not used in the description; and they are not assigned reference numbers.]

Refer to FIG. 4A. In step 402, one or more input GNSS measurements corresponding to a specific navigation satellite and corresponding to a specific time instant are received; they are received, for example, at the control and computing system 208 (see FIG. 2 and FIG. 3). The process then passes to step 404 in which the elevation of the navigation satellite is determined; the elevation can be calculated, for example, from the ephemeris data transmitted by the navigation satellite. The process then passes to step 406 in which the elevation of the navigation satellite is compared to a specified satellite elevation threshold value; this value, for example, can be 20 deg. The process then passes to the decision step 408. If the elevation of the navigation satellite is not greater than the specified satellite elevation threshold value, then the process passes to step 410 (exit), as it is assumed that input GNSS measurements coming from navigation satellites below the specified satellite elevation threshold are not affected by scintillations. If the elevation of the navigation satellite is greater than the specified satellite elevation threshold value, then the process passes to step 412.

In a second embodiment, step 404, step 406, and step 408 are absent, and the process passes directly from step 402 to step 412. That is, there is no screening based on satellite elevation.

In step 412, it is determined whether input GNSS measurements corresponding to two or more carrier frequencies are available. The process then passes to decision step 414. If input GNSS measurements corresponding to two or more carrier frequencies are not available, then the process passes to step 410 (exit). If input GNSS measurements corresponding to two or more carrier frequencies are available, then the process passes to step 416.

In step 416, a first input GNSS measurement corresponding to a first carrier frequency for a specific navigation satellite and a second input GNSS measurement corresponding to a second carrier frequency for a specific navigation satellite are selected. If input GNSS measurements corresponding to only two carrier frequencies (for example, L1 and L2) are available, then those input GNSS measurements are selected. If input GNSS measurements corresponding to three carrier frequencies are available (for example, L1, L2, and L5), then three pair-wise combinations are available: (L1, L2), (L1, L5), and (L2, L5). One, two, or all three pair-wise combinations can be used. If only one or two pair-wise combinations are used, the combination of carrier frequencies can be selected based on various criteria, such as the widest separation between the carrier frequencies or the highest signal-to-noise ratios. If input GNSS measurements corresponding to more than three carrier frequencies are available, similar pair-wise combinations can be generated and selected. In general, input GNSS measurements corresponding to the same navigation satellite and corresponding to different carrier frequencies are assigned to a group, and pair-wise combinations of input GNSS measurements are selected from the group. To simplify the example, a single combination is selected. The process then passes to step 420 (FIG. 4B), in which a geometry-free combination parameter is generated according to (E18).

The process then passes to the decision step 430. If the input GNSS measurements are not based on carrier phases (that is the input GNSS measurements are code phase pseudo-ranges or code-phase pseudo-range differences), then the process passes to step 440 (FIG. 4C). If the input GNSS measurements are based on carrier phases (that is, the input GNSS measurements are carrier phase pseudo-ranges or carrier phase pseudo-range differences), then the process passes to step 432, in which the occurrence of a cycle slip is determined. One method for determining whether a cycle slip has occurred is based on (E26) above.

The process then passes to decision step 434. If a cycle slip has not occurred, then the process passes to step 440. If a cycle slip has not occurred, then the process passes to step 436, in which the cycle slip is isolated, as described above. The process then passes to step 440.

In another embodiment, step 430, step 432, step 434, and step 436 are absent; that is, the process passes directly from step 420 to step 440.

In step 440 (FIG. 4C), an estimate of the dispersion of the geometry-free combination parameter is calculated. As discussed above, various statistical parameters, in particular the standard deviation, can be used to characterize the dispersion. The process then passes to step 442, in which the estimate of the dispersion is compared to a specified dispersion threshold value. The process then passes to the decision step 444. If the estimate of the dispersion is not greater than the dispersion threshold value, then the process passes to step 410 (exit). If the estimate of the dispersion is greater than the dispersion threshold value, then the process passes to step 446, in which a scintillation caused by an ionospheric irregularity is detected. The process then passes to step 448, in which a scintillation indicator is generated. A scintillation indicator can take various forms; for example, it can be a message or one or more bits in a data field (such as a flag in a data field).

The method described above for detecting scintillations can be performed for input GNSS measurements corresponding to each navigation satellite in the constellation of satellites in view. If a scintillation is detected based on input GNSS measurements corresponding to a specific navigation satellite, then the scintillation indicator generated in step 448 (FIG. 4C) corresponds to the input GNSS measurements corresponding to the specific navigation satellite; to simplify the terminology, the scintillation indicator corresponds to the specific navigation satellite.

Figure 5:
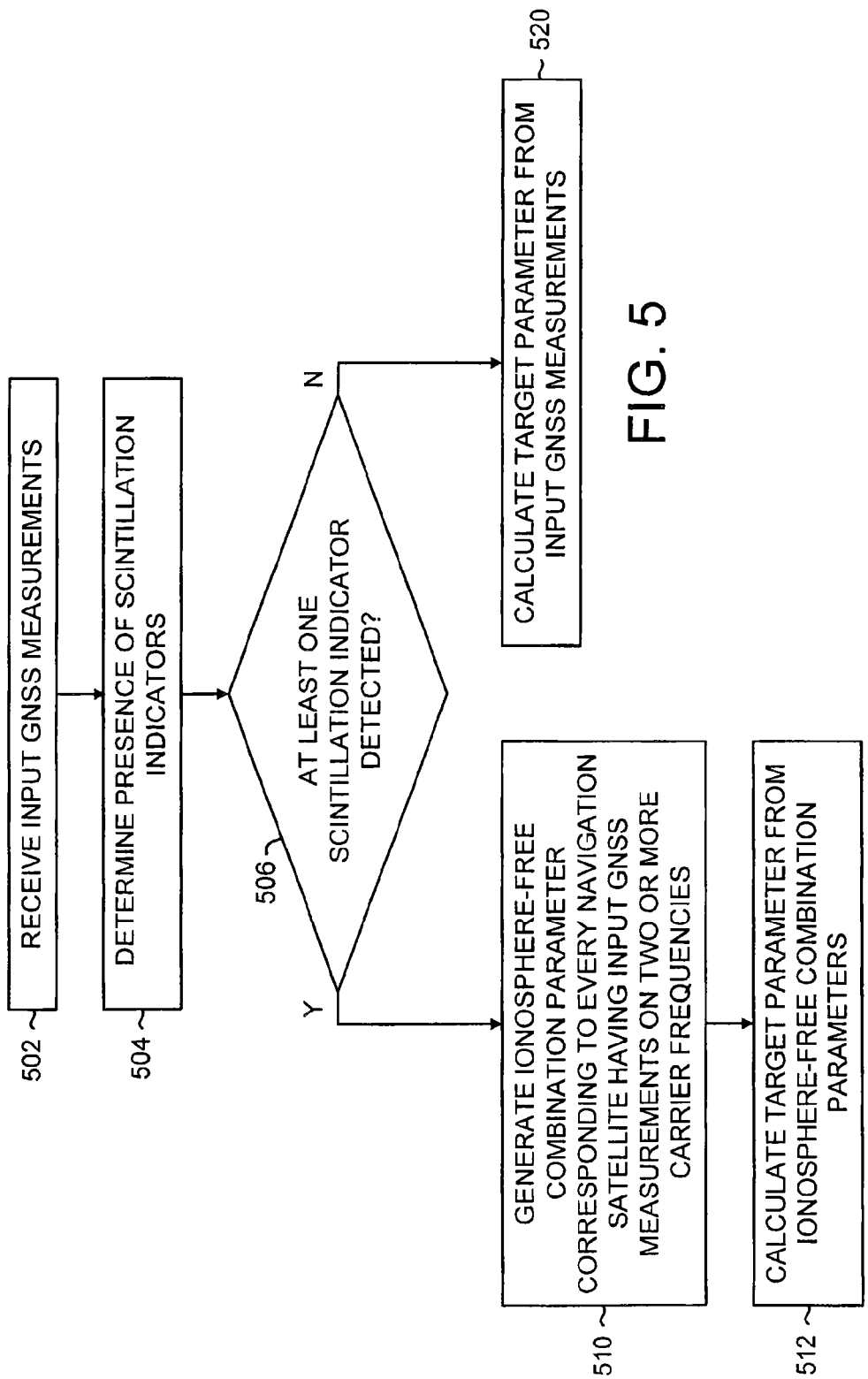
FIG. 5 shows a flowchart of a first method for mitigating scintillations caused by ionospheric irregularities.

FIG. 5 shows a flowchart of a first embodiment of a method for mitigating the effect of scintillations on the calculation of target parameters. In step 502, input GNSS measurements corresponding to specific navigation satellites in a constellation of navigation satellites and corresponding to a specific time instant are received; they are received, for example, at the control and computing system 208 (see FIG. 2 and FIG. 3). The process then passes to step 504, in which the presence of scintillation indicators, such as those generated by the method described above in reference to FIG. 4A-FIG. 4C, are determined.

The process then passes to the decision step 506. If at least one scintillation indicator is not detected, then the process passes to step 520, in which one or more target parameters are calculated from the input GNSS measurements according to standard algorithms well-known in the art and not described herein. If at least one scintillation indicator is detected, then the process passes to step 510, in which an ionosphere-free combination parameter corresponding to every navigation satellite having input GNSS measurements on two or more carrier frequencies is generated according to (E27). The process then passes to step 512, in which one or more target parameters are calculated from the ionosphere-free combination parameters. The minimum required number of navigation satellites with corresponding ionosphere-free combination parameters depends on the number of target parameters and on the number of GNSS. For example, if only one GNSS is used, and the target parameters are three-dimensional position and time, the minimum required number of navigation satellites with corresponding ionosphere-free combination parameters is four. The remaining input GNSS measurements corresponding to the navigation satellites that do not have input GNSS measurements on two or more carrier frequencies are not used in the calculation of the target parameters.

Figure 6:
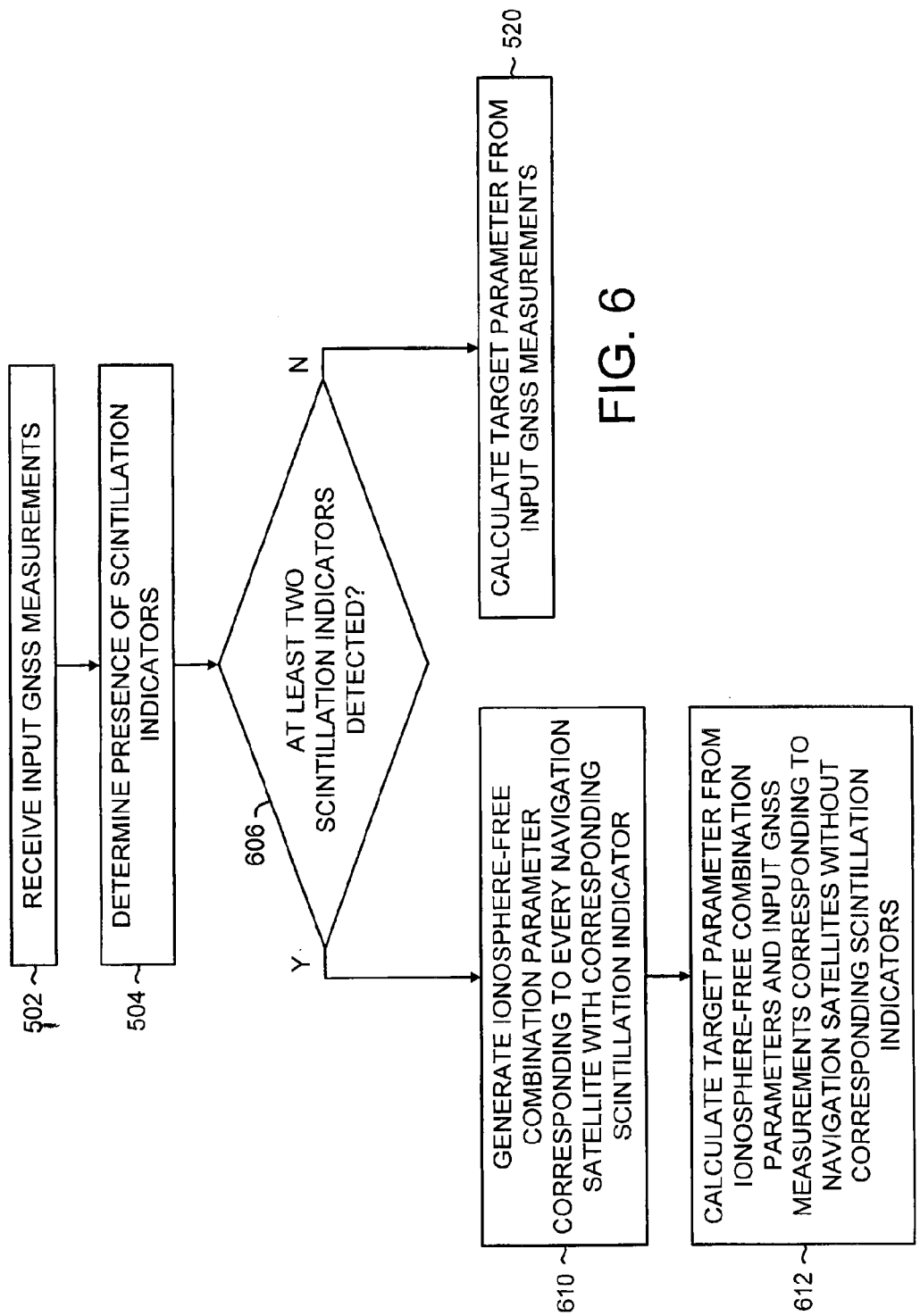
FIG. 6 shows a flowchart of a second method for mitigating scintillations caused by ionospheric irregularities.

FIG. 6 shows a flowchart of a second embodiment of a method for mitigating the effect of scintillations on the calculation of target parameters. In step 502, input GNSS measurements corresponding to specific navigation satellites in a constellation of navigation satellites and corresponding to a specific time instant are received; they are received, for example, at the control and computing system 208 (see FIG. 2 and FIG. 3). The process then passes to step 504, in which the presence of scintillation indicators, such as those generated by the method described above in reference to FIG. 4A-FIG. 4C, are determined.

The process then passes to the decision step 606. If at least two scintillation indicators are not detected, then the process passes to step 520, in which one or more target parameters are calculated from the input GNSS measurements according to standard algorithms well-known in the art and not described herein. If at least two scintillation indicators are detected, then the process passes to step 610, in which an ionosphere-free combination parameter corresponding to every navigation satellite having a corresponding scintillation indicator is generated according to (E27). The process then passes to step 612, in which one or more target parameters are calculated from the ionosphere-free combination parameters and the remaining input GNSS measurements corresponding to the navigation satellites without scintillation indicators. Here the remaining input GNSS measurements refer to the input GNSS measurements not used to generate an ionosphere-free combination parameter; the remaining input GNSS measurements include (a) the input GNSS measurements corresponding to navigation satellites for which input GNSS measurements on only a single carrier frequency are available and (b) the input GNSS measurements corresponding to navigation satellites for which GNSS measurements on two or more carrier frequencies are available but for which no scintillation indicators are generated. The algorithms for calculating the target parameters from the ionosphere-free combination parameters and the remaining input GNSS measurements are well-known in the art and are not described herein.

For the second method, the minimum required number of navigation satellites depends on the number of target parameters and on the number of GNSS. For example, if only one GNSS is in use, the target parameters are three-dimensional position and time, and the remaining input GNSS measurements are single frequency, the minimum required total number of navigation satellites is five. In this example, a minimum of two navigation satellites with corresponding scintillation indicators is needed to resolve for the new unknown and add to position calculation. A new unknown combines clock offset and other common biases of GFC, which typically differs from combination of clock offset and other common biases of the remaining input GNSS measurements.

In the first method, described above in reference to FIG. 5, only one unknown is introduced for all IFC parameters;

that is, the clock offset and other common biases of the IFC parameters with respect to each GNSS. In the second method, described above in reference to FIG. 6, more unknowns are introduced; that is, the clock offset and other common biases of the IFC parameters, and the clock offsets and other common biases of input GNSS measurements corresponding to a different carrier frequency (one unknown per frequency for all measurements). Although the second method needs more unknowns, it can provide more accurate results because input GNSS measurements are less noisy than IFC parameters. The particular method that is more advantageous in a particular application is selected based upon analysis of multiple factors, such as the number of navigation satellites with scintillations, the number of navigation satellites without scintillations, the satellite geometry relative to a navigation receiver, weights assigned to input GNSS measurements, and other factors.

Figure 7:
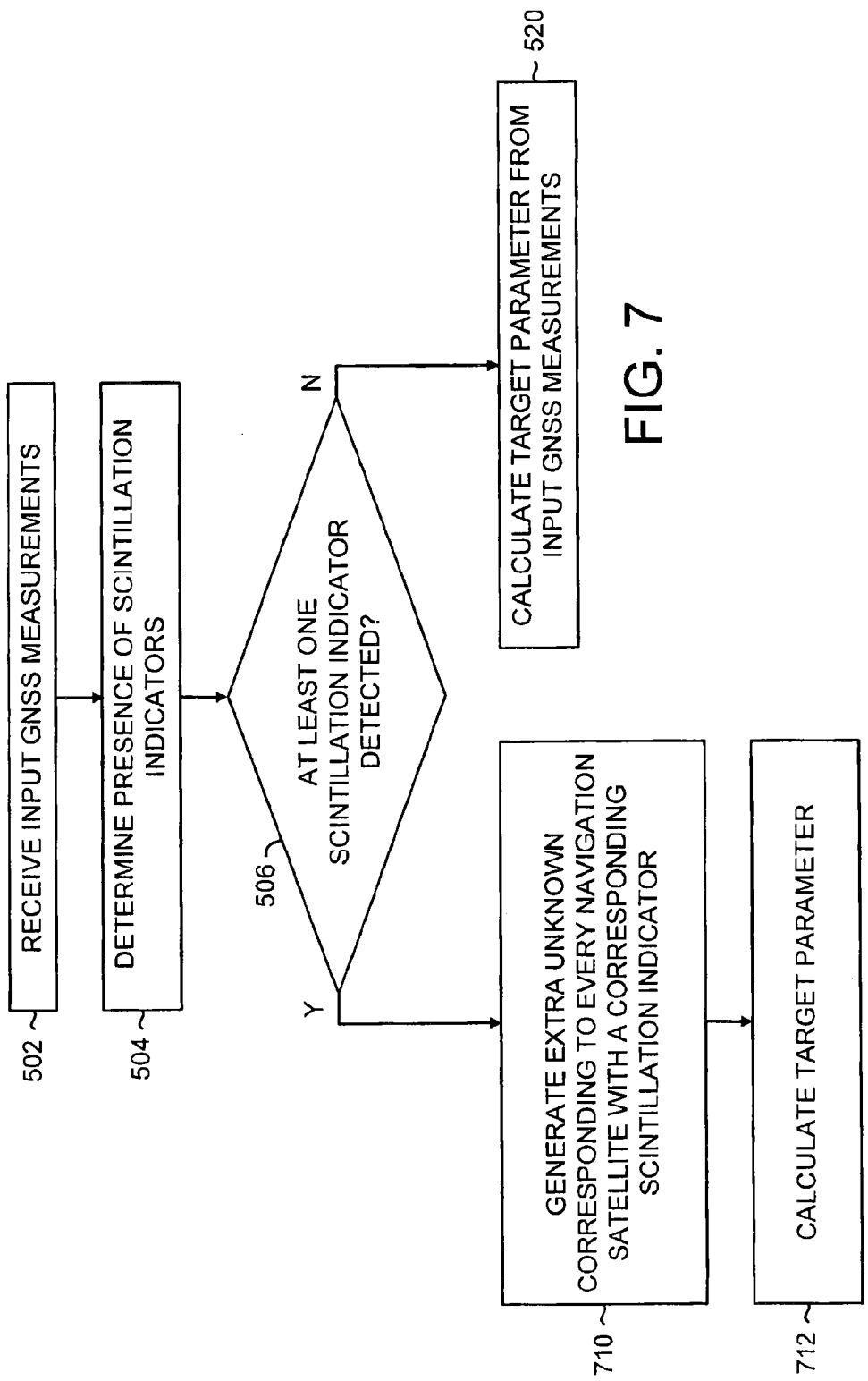
FIG. 7 shows a flowchart of a third method for mitigating scintillations caused by ionospheric irregularities.

FIG. 7 shows a flowchart of a third embodiment of a method for mitigating the effect of scintillations on the calculation of target parameters. In step 502, input GNSS measurements corresponding to specific navigation satellites in a constellation of navigation satellites and corresponding to a specific time instant are received; they are received, for example, at the control and computing system 208 (see FIG. 2 and FIG. 3). The process then passes to step 504, in which the presence of scintillation indicators, such as those generated by the method described above in reference to FIG. 4A-FIG. 4C, are determined.

The process then passes to the decision step 506. If at least one scintillation indicator is not detected, then the process passes to step 520, in which one or more target parameters are calculated from the input GNSS measurements according to standard algorithms well-known in the art and not described herein. If at least one scintillation indicator is detected, then the process passes to step 710, in which an extra unknown is generated for every navigation satellite with a corresponding scintillation indicator to account for the ionosphere impact. The methods for estimating the ionosphere impact as an extra unknown are well-known in the art and are not described herein. The process then passes to step 712 in which one or more target parameters are calculated. The algorithms for calculating the target parameters under these conditions are well-known in the art and are not described herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for processing global navigation satellite system (GNSS) measurements, the method comprising the steps of:
receiving a first input GNSS measurement corresponding to a navigation satellite and corresponding to a first carrier frequency and a second GNSS measurement corresponding to the navigation satellite and corresponding to a second carrier frequency, wherein the second carrier frequency is different from the first carrier frequency;
calculating a geometry-free combination parameter based at least in part on the first input GNSS measurement, the second input GNSS measurement, the first carrier frequency, and the second carrier frequency; and
determining, based at least in part on the geometry-free combination parameter, whether a scintillation caused by an ionospheric irregularity has occurred.

2. The method of claim 1, wherein the step of determining, based at least in part on the geometry-free combination parameter, whether a scintillation caused by an ionospheric irregularity has occurred comprises the steps of:
calculating an estimate of a dispersion of the geometry-free combination parameter over a specified time interval;
comparing the estimate of the dispersion of the geometry-free combination parameter to a specified threshold value;
upon determining that the estimate of the dispersion of the geometry-free combination parameter is greater than the specified threshold value:
determining that a scintillation caused by an ionospheric irregularity has occurred; and
upon determining that the estimate of the dispersion of the geometry-free combination parameter is not greater than the specified threshold value:
determining that a scintillation caused by an ionospheric irregularity has not occurred.

3. The method of claim 1, wherein the navigation satellite has an elevation angle greater than a specified threshold value.

4. The method of claim 1, wherein:
the first input GNSS measurement corresponding to the first carrier frequency comprises a first code phase pseudo-range based at least in part on a first navigation signal having the first carrier frequency, wherein the first navigation signal is transmitted from the navigation satellite and received by a navigation receiver;
the second input GNSS measurement corresponding to the second carrier frequency comprises a second code phase pseudo-range based at least in part on a second navigation signal having the second carrier frequency, wherein the second navigation signal is transmitted from the navigation satellite and received by the navigation receiver; and
the geometry-free combination parameter is calculated from the equation $$GFC=(D_1-D_2)/(1-\mu),$$

wherein:
GFC represents the geometry-free combination parameter;
$D_1$ represents the first code phase pseudo-range;
$D_2$ represents the second code phase pseudo-range;
$\mu=f_1^2/f_2^2$;
$f_1$ represents the first carrier frequency; and
$f_2$ represents the second carrier frequency.

5. The method of claim 1, wherein:
the first input GNSS measurement corresponding to the first carrier frequency comprises a first code phase pseudo-range difference based at least in part on a first navigation signal having the first carrier frequency, wherein the first navigation signal is transmitted from the navigation satellite and received by a first navigation receiver in a rover and received by a second navigation receiver in a base station;

the second input GNSS measurement corresponding to the second carrier frequency comprises a second code phase pseudo-range difference based at least in part on a second navigation signal having the second carrier frequency, wherein the second navigation signal is transmitted from the navigation satellite and received by the first navigation receiver in the rover and received by the second navigation receiver in the base station; and the geometry-free combination parameter is calculated from the equation $$GFC=(\Delta D_1-\Delta D_2)/(1-\mu),$$

wherein:

GFC represents the geometry-free combination parameter;

$\Delta D_1$ represents the first code phase pseudo-range difference;

$\Delta D_2$ represents the second code phase pseudo-range difference;

$\mu=f_1^2/f_2^2$;

$f_1$ represents the first carrier frequency; and $f_2$ represents the second carrier frequency.

6. The method of claim 1, wherein:

the first input GNSS measurement corresponding to the first carrier frequency comprises a first carrier phase pseudo-range based at least in part on a first navigation signal having the first carrier frequency, wherein the first navigation signal is transmitted from the navigation satellite and received by a navigation receiver;

the second input GNSS measurement corresponding to the second carrier frequency comprises a second carrier phase pseudo-range based at least in part on a second navigation signal having the second carrier frequency, wherein the second navigation signal is transmitted from the navigation satellite and received by the navigation receiver; and the geometry-free combination parameter is calculated from the equation $$GFC=(\phi_1-\phi_2)/(1-\mu),$$

wherein:

GFC represents the geometry-free combination parameter;

$\phi_1$ represents the first carrier phase pseudo-range;

$\phi_2$ represents the second carrier phase pseudo-range;

$\mu=f_1^2/f_2^2$;

$f_1$ represents the first carrier frequency; and $f_2$ represents the second carrier frequency.

7. The method of claim 6, further comprising the steps of:
determining whether a cycle slip has occurred; and
upon determining that a cycle slip has occurred:
isolating the first input GNSS measurement and the second input GNSS measurement.

8. The method of claim 1, wherein:

the first input GNSS measurement corresponding to the first carrier frequency comprises a first carrier phase pseudo-range difference based at least in part on a first navigation signal having the first carrier frequency, wherein the first navigation signal is transmitted from the navigation satellite and received by a first navigation receiver in a rover and received by a second navigation receiver in a base station;

the second input GNSS measurement corresponding to the second carrier frequency comprises a second carrier phase pseudo-range difference based at least in part on a second navigation signal having the second carrier frequency, wherein the second navigation signal is transmitted from the navigation satellite and received by the first navigation receiver in the rover and received by the second navigation receiver in the base station; and the geometry-free combination parameter is calculated from the equation $$GFC=(\Delta\phi_1-\Delta\phi_2)/(1-\mu),$$

wherein:

GFC represents the geometry-free combination parameter;

$\Delta\phi_1$ represents the first carrier phase pseudo-range difference;

$\Delta\phi_2$ represents the second carrier phase pseudo-range difference;

$\mu=f_1^2/f_2^2$;

$f_1$ represents the first carrier frequency; and $f_2$ represents the second carrier frequency.

9. The method of claim 8, further comprising the steps of:
determining whether a cycle slip has occurred; and
upon determining that a cycle slip has occurred:
isolating the first input GNSS measurement and the second input GNSS measurement.

10. An apparatus for processing global navigation satellite system (GNSS) measurements, the apparatus comprising:

means for receiving a first input GNSS measurement corresponding to a navigation satellite and corresponding to a first carrier frequency and a second GNSS measurement corresponding to the navigation satellite and corresponding to a second carrier frequency, wherein the second carrier frequency is different from the first carrier frequency;

means for calculating a geometry-free combination parameter based at least in part on the first input GNSS measurement, the second input GNSS measurement, the first carrier frequency, and the second carrier frequency; and means for determining, based at least in part on the geometry-free combination parameter, whether a scintillation caused by an ionospheric irregularity has occurred.

11. The apparatus of claim 10, wherein the means for determining, based at least in part on the geometry-free combination parameter, whether a scintillation caused by an ionospheric irregularity has occurred comprises:

means for calculating an estimate of a dispersion of the geometry-free combination parameter over a specified time interval;

means for comparing the estimate of the dispersion of the geometry-free combination parameter to a specified threshold value;

means for, upon determining that the estimate of the dispersion of the geometry-free combination parameter is greater than the specified threshold value:
determining that a scintillation caused by an ionospheric irregularity has occurred; and means for, upon determining that the estimate of the dispersion of the geometry-free combination parameter is not greater than the specified threshold value:
determining that a scintillation caused by an ionospheric irregularity has not occurred.

12. The apparatus of claim 10, wherein the navigation satellite has an elevation angle greater than a specified threshold value.

13. The apparatus of claim 10, wherein:
the first input GNSS measurement corresponding to the first carrier frequency comprises a first code phase pseudo-range based at least in part on a first navigation signal having the first carrier frequency, wherein the first navigation signal is transmitted from the navigation satellite and received by a navigation receiver;
the second input GNSS measurement corresponding to the second carrier frequency comprises a second code phase pseudo-range based at least in part on a second navigation signal having the second carrier frequency, wherein the second navigation signal is transmitted from the navigation satellite and received by the navigation receiver; and
the geometry-free combination parameter is calculated from the equation $$GFC=(D_1-D_2)/(1-\mu),$$

wherein:
GFC represents the geometry-free combination parameter;
$D_1$ represents the first code phase pseudo-range;
$D_2$ represents the second code phase pseudo-range;
$\mu=f_1^2/f_2^2$;
$f_1$ represents the first carrier frequency; and
$f_2$ represents the second carrier frequency.

14. The apparatus of claim 10, wherein:
the first input GNSS measurement corresponding to the first carrier frequency comprises a first code phase pseudo-range difference based at least in part on a first navigation signal having the first carrier frequency, wherein the first navigation signal is transmitted from the navigation satellite and received by a first navigation receiver in a rover and received by a second navigation receiver in a base station;
the second input GNSS measurement corresponding to the second carrier frequency comprises a second code phase pseudo-range difference based at least in part on a second navigation signal having the second carrier frequency, wherein the second navigation signal is transmitted from the navigation satellite and received by the first navigation receiver in the rover and received by the second navigation receiver in the base station; and
the geometry-free combination parameter is calculated from the equation $$GFC=(\Delta D_1-\Delta D_2)/(1-\mu),$$

wherein:
GFC represents the geometry-free combination parameter;
$\Delta D_1$ represents the first code phase pseudo-range difference;
$\Delta D_2$ represents the second code phase pseudo-range difference;
$\mu=f_1^2/f_2^2$;
$f_1$ represents the first carrier frequency; and
$f_2$ represents the second carrier frequency.

15. The apparatus of claim 10, wherein:
the first input GNSS measurement corresponding to the first carrier frequency comprises a first carrier phase pseudo-range based at least in part on a first navigation signal having the first carrier frequency, wherein the first navigation signal is transmitted from the navigation satellite and received by a navigation receiver;
the second input GNSS measurement corresponding to the second carrier frequency comprises a second carrier phase pseudo-range based at least in part on a second navigation signal having the second carrier frequency, wherein the second navigation signal is transmitted from the navigation satellite and received by the navigation receiver; and
the geometry-free combination parameter is calculated from the equation $$GFC=(\phi_1-\phi_2)/(1-\mu),$$

wherein:
GFC represents the geometry-free combination parameter;
$\phi_1$ represents the first carrier phase pseudo-range;
$\phi_2$ represents the second carrier phase pseudo-range;
$\mu=f_1^2/f_2^2$;
$f_1$ represents the first carrier frequency; and
$f_2$ represents the second carrier frequency.

16. The apparatus of claim 15, further comprising:
means for determining whether a cycle slip has occurred; and
means for, upon determining that a cycle slip has occurred:
isolating the first input GNSS measurement and the second input GNSS measurement.

17. The apparatus of claim 10, wherein:
the first input GNSS measurement corresponding to the first carrier frequency comprises a first carrier phase pseudo-range difference based at least in part on a first navigation signal having the first carrier frequency, wherein the first navigation signal is transmitted from the navigation satellite and received by a first navigation receiver in a rover and received by a second navigation receiver in a base station;
the second input GNSS measurement corresponding to the second carrier frequency comprises a second carrier phase pseudo-range difference based at least in part on a second navigation signal having the second carrier frequency, wherein the second navigation signal is transmitted from the navigation satellite and received by the first navigation receiver in the rover and received by the second navigation receiver in the base station; and
the geometry-free combination parameter is calculated from the equation $$GFC=(\Delta\phi_1-\Delta\phi_2)/(1-\mu),$$

wherein:
GFC represents the geometry-free combination parameter;
$\Delta\phi_1$ represents the first carrier phase pseudo-range difference;
$\Delta\phi_2$ represents the second carrier phase pseudo-range difference;
$\mu=f_1^2/f_2^2$;
$f_1$ represents the first carrier frequency; and
$f_2$ represents the second carrier frequency.

18. The apparatus of claim 17, further comprising:
means for determining whether a cycle slip has occurred; and
means for, upon determining that a cycle slip has occurred:
isolating the first input GNSS measurement and the second input GNSS measurement.

19. A non-transitory computer readable medium storing computer program instructions, which, when executed by a processor, cause the processor to perform a method for processing global navigation satellite system (GNSS) measurements, the method comprising the steps of:
receiving a first input GNSS measurement corresponding to a navigation satellite and corresponding to a first carrier frequency and a second GNSS measurement corresponding to the navigation satellite and corresponding to a second carrier frequency, wherein the second carrier frequency is different from the first carrier frequency;
calculating a geometry-free combination parameter based at least in part on the first input GNSS measurement, the second input GNSS measurement, the first carrier frequency, and the second carrier frequency; and
determining, based at least in part on the geometry-free combination parameter, whether a scintillation caused by an ionospheric irregularity has occurred.

20. The non-transitory computer readable medium of claim 19, wherein the step of determining, based at least in part on the geometry-free combination parameter, whether a scintillation caused by an ionospheric irregularity has occurred comprises the steps of:
calculating an estimate of a dispersion of the geometry-free combination parameter over a specified time interval;
comparing the estimate of the dispersion of the geometry-free combination parameter to a specified threshold value;
upon determining that the estimate of the dispersion of the geometry-free combination parameter is greater than the specified threshold value:
determining that a scintillation caused by an ionospheric irregularity has occurred; and
upon determining that the estimate of the dispersion of the geometry-free combination parameter is not greater than the specified threshold value:
determining that a scintillation caused by an ionospheric irregularity has not occurred.

21. The non-transitory computer readable medium of claim 19, wherein the navigation satellite has an elevation angle greater than a specified threshold value.

22. The non-transitory computer readable medium of claim 19, wherein:
the first input GNSS measurement corresponding to the first carrier frequency comprises a first code phase pseudo-range based at least in part on a first navigation signal having the first carrier frequency, wherein the first navigation signal is transmitted from the navigation satellite and received by a navigation receiver;
the second input GNSS measurement corresponding to the second carrier frequency comprises a second code phase pseudo-range based at least in part on a second navigation signal having the second carrier frequency, wherein the second navigation signal is transmitted from the navigation satellite and received by the navigation receiver; and
the geometry-free combination parameter is calculated from the equation $$GFC=(D_1-D_2)/(1-\mu),$$

wherein:
GFC represents the geometry-free combination parameter;
$D_1$ represents the first code phase pseudo-range;
$D_2$ represents the second code phase pseudo-range;
$\mu=f_1^2/f_2^2$;
$f_1$ represents the first carrier frequency; and
$f_2$ represents the second carrier frequency.

23. The non-transitory computer readable medium of claim 19, wherein:
the first input GNSS measurement corresponding to the first carrier frequency comprises a first code phase pseudo-range difference based at least in part on a first navigation signal having the first carrier frequency, wherein the first navigation signal is transmitted from the navigation satellite and received by a first navigation receiver in a rover and received by a second navigation receiver in a base station;
the second input GNSS measurement corresponding to the second carrier frequency comprises a second code phase pseudo-range difference based at least in part on a second navigation signal having the second carrier frequency, wherein the second navigation signal is transmitted from the navigation satellite and received by the first navigation receiver in the rover and received by the second navigation receiver in the base station; and
the geometry-free combination parameter is calculated from the equation $$GFC=(\Delta D_1-\Delta D_2)/(1-\mu),$$

wherein:
GFC represents the geometry-free combination parameter;
$\Delta D_1$ represents the first code phase pseudo-range difference;
$\Delta D_2$ represents the second code phase pseudo-range difference;
$\mu=f_1^2/f_2^2$;
$f_1$ represents the first carrier frequency; and
$f_2$ represents the second carrier frequency.

24. The non-transitory computer readable medium of claim 19, wherein:
the first input GNSS measurement corresponding to the first carrier frequency comprises a first carrier phase pseudo-range based at least in part on a first navigation signal having the first carrier frequency, wherein the first navigation signal is transmitted from the navigation satellite and received by a navigation receiver;
the second input GNSS measurement corresponding to the second carrier frequency comprises a second carrier phase pseudo-range based at least in part on a second navigation signal having the second carrier frequency, wherein the second navigation signal is transmitted from the navigation satellite and received by the navigation receiver; and
the geometry-free combination parameter is calculated from the equation $$GFC=(\phi_1-\phi_2)/(1-\mu),$$

wherein:
GFC represents the geometry-free combination parameter;
$\phi_1$ represents the first carrier phase pseudo-range;
$\phi_1$ represents the second carrier phase pseudo-range;
$\mu=f_1^2/f_2^2$;
$f_1$ represents the first carrier frequency; and
$f_2$ represents the second carrier frequency.

25. The non-transitory computer readable medium of claim 24, wherein the method further comprises the steps of:
determining whether a cycle slip has occurred; and
upon determining that a cycle slip has occurred:
isolating the first input GNSS measurement and the second input GNSS measurement.

26. The non-transitory computer readable medium of claim 19, wherein:

the first input GNSS measurement corresponding to the first carrier frequency comprises a first carrier phase pseudo-range difference based at least in part on a first navigation signal having the first carrier frequency, wherein the first navigation signal is transmitted from the navigation satellite and received by a first navigation receiver in a rover and received by a second navigation receiver in a base station;

the second input GNSS measurement corresponding to the second carrier frequency comprises a second carrier phase pseudo-range difference based at least in part on a second navigation signal having the second carrier frequency, wherein the second navigation signal is transmitted from the navigation satellite and received by the first navigation receiver in the rover and received by the second navigation receiver in the base station; and the geometry-free combination parameter is calculated from the equation $$GFC = (\Delta\phi_1 - \Delta\phi_2)/(1-\mu),$$

wherein:

GFC represents the geometry-free combination parameter;

$\Delta\phi_1$ represents the first carrier phase pseudo-range difference;

$\Delta\phi_2$ represents the second carrier phase pseudo-range difference;

$\mu = f_1^2/f_2^2$;

$f_1$ represents the first carrier frequency; and $f_2$ represents the second carrier frequency.

27. The non-transitory computer readable medium of claim 26, wherein the method further comprises the steps of:

determining whether a cycle slip has occurred; and upon determining that a cycle slip has occurred:

isolating the first input GNSS measurement and the second input GNSS measurement.

* * * * *

UNITED STATES PATENT AND TRADEMARK OFFICE
CERTIFICATE OF CORRECTION

PATENT NO. : 9,488,729 B2
APPLICATION NO. : 14/428476
DATED : November 8, 2016
INVENTOR(S) : Sergey Vladislavovich Averin et al.

Page 1 of 1

It is certified that error appears in the above-identified patent and that said Letters Patent is hereby corrected as shown below:

In the Specification

In Column 16, Line 8, "where i is an integer index 1;" should read --where i is an integer index $\geq 1$;--

Signed and Sealed this
Seventh Day of March, 2017

Michelle K. Lee
*Director of the United States Patent and Trademark Office*